(12) United States Patent
Wei

(10) Patent No.: US 8,149,726 B2
(45) Date of Patent: Apr. 3, 2012

(54) WIRELESS COMMUNICATION SYSTEM AND METHOD

(75) Inventor: Hung-Yu Wei, Hsinchu (TW)

(73) Assignees: Industrial Technology Research Institute, Chutung, Hsinchu (TW); National Taiwan University, Taipei (TW)

( * ) Notice: Subject to any disclaimer, the term of this patent is extended or adjusted under 35 U.S.C. 154(b) by 581 days.

(21) Appl. No.: 11/987,930

(22) Filed: Dec. 6, 2007

(65) Prior Publication Data

US 2008/0165699 A1 Jul. 10, 2008

Related U.S. Application Data

(60) Provisional application No. 60/878,409, filed on Jan. 4, 2007.

(51) Int. Cl.
*H04L 12/28* (2006.01)
*H04W 4/00* (2009.01)
*H04J 3/06* (2006.01)

(52) U.S. Cl. ........ 370/252; 370/315; 370/328; 370/508; 455/503

(58) Field of Classification Search .................. None
See application file for complete search history.

(56) References Cited

U.S. PATENT DOCUMENTS

| | | | |
|---|---|---|---|
| 4,696,052 | A | 9/1987 | Breeden |
| 4,850,032 | A | 7/1989 | Freeburg |
| 5,485,632 | A | 1/1996 | Ng et al. |
| 6,226,266 | B1 | 5/2001 | Galand et al. |
| 6,466,548 | B1 | 10/2002 | Fitzgerald |
| 6,735,178 | B1 | 5/2004 | Srivastava et al. |
| 7,123,589 | B1 * | 10/2006 | Dawes et al. ............ 370/248 |

(Continued)

FOREIGN PATENT DOCUMENTS

EP 1 276 281 1/2003

(Continued)

OTHER PUBLICATIONS

Extended European Search Report, including European Search Report and European Search Opinion, from the European Patent Office, mailed Jun. 17, 2008, for European Patent Application No. 08250011.7 (8 pages).

(Continued)

*Primary Examiner* — Marcus R Smith
(74) *Attorney, Agent, or Firm* — Finnegan, Henderson, Farabow, Garrett & Dunner, LLP

(57) ABSTRACT

A method for performing wireless communication in a network by at least one of a plurality of network nodes, the network including a network coordinator, the plurality of network nodes, and a plurality of subscriber stations. The method includes sending, by at least one of the plurality of network nodes, delay data to at least one of the network coordinator or one or more upstream network nodes. The delay data includes a network node delay data associated with the at least one of the plurality of network nodes, and the one or more upstream network nodes include any of the plurality of network nodes located along an upstream transmission path between the at least one network node and the network coordinator. In addition, the method includes receiving, from at least one of the network coordinator or the one or more upstream network nodes, target delay data, and receiving, from at least one of the network coordinator or the one or more upstream network nodes, a message. Further, the method includes transmitting, at a target transmission time, the message to one or more of the plurality of subscriber stations. The target delay data is based on the delay data, and the target transmission time is based on the target delay data.

56 Claims, 17 Drawing Sheets

U.S. PATENT DOCUMENTS

| | | | |
|---|---|---|---|
| 7,349,390 B2 * | 3/2008 | Igarashi et al. | 370/390 |
| 7,461,026 B2 * | 12/2008 | Schluetter | 705/37 |
| 7,492,770 B2 * | 2/2009 | Senthilnathan et al. | 370/394 |
| 2004/0252643 A1 | 12/2004 | Joshi | |
| 2006/0153091 A1 * | 7/2006 | Lin et al. | 370/252 |
| 2007/0072604 A1 * | 3/2007 | Wang | 455/428 |
| 2008/0031180 A1 * | 2/2008 | Hsieh et al. | 370/315 |
| 2008/0045144 A1 * | 2/2008 | Fujita | 455/7 |
| 2008/0186950 A1 * | 8/2008 | Zhu et al. | 370/350 |
| 2009/0073916 A1 * | 3/2009 | Zhang et al. | 370/315 |

FOREIGN PATENT DOCUMENTS

| | | |
|---|---|---|
| JP | 2001-156705 | 6/2001 |
| JP | 2003-298630 | 10/2003 |
| WO | WO 92/13417 | 8/1992 |
| WO | WO 2006/035707 | 4/2006 |

OTHER PUBLICATIONS

U.S. Appl. No. 60/810,573, filed Jun. 2, 2006.
U.S. Appl. No. 60/892,570, filed Mar. 2, 2007.

* cited by examiner

WIRELESS COMMUNICATION SYSTEM AND METHOD

PRIORITY

This application claims the benefit of U.S. Provisional Application No. 60/878,409, filed Jan. 4, 2007, which is incorporated by reference herein in its entirety for any purpose.

TECHNICAL FIELD

The present disclosure relates generally to methods and devices for wireless communication systems and, more particularly, to wireless communication systems, methods, and devices including control nodes, intermediary nodes, and destination nodes.

BACKGROUND

Due to an increasing number of wireless devices and a growing demand for wireless services, wireless communication systems continue to expand. To meet the growing demand, wireless providers have deployed a greater number of wireless transmitters. As an alternative, however, wireless providers have also utilized relay-based systems.

In a relay-based system, one node of a wireless system may communicate with another node in the wireless system using one or more intermediary nodes, called relay nodes. In some systems, the relay node may be referred to as a relay station, and the combination of nodes and connections between an originating node and a destination node may be referred to as a transmission path. Relay-based systems may be found in any type of wireless network.

An example of a relay-based system is a multi-hop relay (MR) network. FIG. 1 is a diagram of a conventional MR network 100 based on the Institute of Electrical and Electronics Engineers (IEEE) 802.16 family of standards. As shown in FIG. 1, MR network 100 may include one or more transmitters, e.g., base station (BS) 110, one or more relay stations (RS) 120, including RSs 120a, 120b, and 120c, one or more subscriber stations (SS) 130, including SSs 130x, 130y, and 130z, and one or more transmission paths (TP) 140, including TP 140a and TP 140b.

In MR network 100, communication between a transmitter station (e.g., BS 110) and subscriber stations (e.g., SS 130x, SS 130y, SS 130z, etc.) may be achieved using one or more relay stations (e.g., RS 120a, RS 120b, RS 120c, etc.). For example, in MR network 100, RS 120a may receive data from BS 110 and send the data to another relay station (e.g., RS 120b). Alternatively, RS 120a may receive data from a downstream relay station (e.g., RS 120b), and send it to BS 110. As another example, RS 120b may receive data from RS 120a and send the data to a supported subscriber station (e.g., SS 130y). Alternatively, RS 120b may receive data from a subscriber station (e.g., SS 130y), and send it to an upstream relay station (e.g., RS 120a).

As shown in FIG. 1, transmission path (TP) 140 may be the transmission route from BS 110 through the one or more RSs 120. For example, the transmission route from BS 110 to RS 120b (i.e., TP 140a) may include BS 110, RS 120a, and RS 120b. The transmission route from BS 110 to RS 120c (i.e., TP 140b) may include BS 110 and RS 120c.

Because transmission paths may vary in their lengths, the length of time for a broadcast transmission packet to move along different transmission paths may also vary. Thus, when BS 110 transmits data along multiple transmission paths, the final relay stations in each of the various transmission paths may receive their data at different times. The final relay stations may, in turn, transmit the data to their subscriber stations at different times, thereby causing the subscriber stations to receive the data at different times.

Thus, there is a need for systems and methods that ensure the synchronous transmission of broadcast data packets from relay stations, varying in their transmission latency, along transmission paths of varying lengths. Additionally, there is a need for systems and methods to ensure synchronous transmission of broadcast and multicast data in multi-hop transmission systems.

The disclosed embodiments are directed to overcoming one or more of the problems set forth above.

SUMMARY OF THE INVENTION

In one exemplary embodiment, the present disclosure is directed to a method for managing wireless communication in a network by a network coordinator, the network including the network coordinator, a plurality of network nodes, and a plurality of subscriber stations. The method includes receiving, by the network coordinator, delay data associated with one or more transmission paths, and calculating, for each of the one or more transmission paths, a total transmission path delay. Each of the one or more transmission paths includes at least one of the plurality of network nodes. The method also includes calculating, for each of the one or more transmission paths, target delay data based on the total transmission path delay and sending, by the network coordinator, the target delay data along each of the one or more transmission paths. In addition, the method includes transmitting, by the network coordinator, a message along each of the one or more transmission paths.

In another exemplary embodiment, the present disclosure is directed to a network coordinator for managing wireless communication in a network, the network including the network coordinator, a plurality of network nodes, and a plurality of subscriber stations. The network coordinator station includes at least one memory to store data and instructions and at least one processor configured to access the memory and, when executing the instructions, to receive, by the network coordinator, delay data associated with one or more transmission paths, and calculate, for each of the one or more transmission paths, a total transmission path delay. Each of the one or more transmission paths includes at least one of the plurality of network nodes. The processor is also configured to calculate, for each of the one or more transmission paths, target delay data based on the total transmission path delay and send, by the network coordinator, the target delay data along each of the one or more transmission paths. In addition, the processor is configured to transmit, by the network coordinator, a message along each of the one or more transmission paths.

In another exemplary embodiment, the present disclosure is directed to a method for performing wireless communication in a network by an access network node, the network including a network coordinator, the plurality of network nodes, and a plurality of subscriber stations. In the method, the access network node is included in the plurality of network nodes. The method includes sending, by the access network node, delay data to at least one of the network coordinator or one or more upstream network nodes. The delay data includes a network node delay data associated with the access network node, and the one or more upstream network nodes include any of the plurality of network nodes located along an upstream transmission path between the access network node and the network coordinator. The method also includes receiving, from at least one of the network coordinator or the one or more upstream network nodes, target delay data. The target delay data is based on the delay data. In addition, the method includes receiving, from at least one of the network coordinator or the one or more upstream network nodes, a message, and transmitting, at a target transmission time, the message to one or more of the plurality of subscriber stations. The target transmission time is based on the target delay data.

In another exemplary embodiment, the present disclosure is directed to a wireless communication station for performing wireless communication in a network, the network including a network coordinator, a plurality of network nodes including the wireless communication station, and a plurality of subscriber stations. The wireless communication station includes at least one memory to store data and instructions and at least one processor configured to access the memory and, when executing the instructions, to send, by the wireless communication station, delay data to at least one of the network coordinator or one or more upstream network nodes. The delay data includes a network node delay data associated with the wireless communication station, and the one or more upstream network nodes include any of the plurality of network nodes located along an upstream transmission path between the wireless communication station and the network coordinator. The at least one processor is further configured to receive, from at least one of the network coordinator or the one or more upstream network nodes, target delay data. The target delay data is based on the delay data. In addition, the at least one processor is configured to receive, from at least one of the network coordinator or the one or more upstream network nodes, a message, and transmit, at a target transmission time, the message to one or more of the plurality of subscriber stations. The target transmission time is based on the target delay data.

In another exemplary embodiment, the present disclosure is directed to a method for performing wireless communication in a network by an intermediary network node, the network including a network coordinator, the plurality of network nodes, and a plurality of subscriber stations. In the method, the intermediary network node is included in the plurality of network nodes. The method includes sending, by the intermediary network node, network node delay data to at least one of the network coordinator or one or more upstream network nodes. The network node delay data is associated with the intermediary network node, and the one or more upstream network nodes include any of the plurality of network nodes located along an upstream transmission path between the intermediary network node and the network coordinator. The method also includes forwarding, to at least one of the network coordinator or the one or more upstream network nodes, downstream delay data. The downstream delay data is associated with one or more downstream network nodes located along a downstream transmission paths between the intermediary network node and one or more of the plurality of subscriber stations. In addition, the method includes receiving, from at least one of the network coordinator or the one or more upstream network nodes, target delay data, and forwarding, to the one or more downstream network nodes, the target delay data. Further, the method includes receiving, from at least one of the network coordinator or the one or more upstream network nodes, a message, and forwarding the message to the one or more downstream network nodes.

In another exemplary embodiment, the present disclosure is directed to a wireless communication station for performing wireless communication in a network, the network including a network coordinator, a plurality of network nodes including the wireless communication station, and a plurality of subscriber stations. The wireless communication station includes at least one memory to store data and instructions and at least one processor configured to access the memory and, when executing the instructions, to send, by the wireless communication station, network node delay data to at least one of the network coordinator or one or more upstream network nodes. The network node delay data is associated with the wireless communication station, and the one or more upstream network nodes include any of the plurality of network nodes located along an upstream transmission path between the wireless communication station and the network coordinator. The processor is also configured to forward, to at least one of the network coordinator or the one or more upstream network nodes, downstream delay data. The downstream delay data is associated with one or more downstream network nodes located along a downstream transmission path between the wireless communication station and one or more of the plurality of subscriber stations. In addition, the processor is configured to receive, from at least one of the network coordinator or the one or more upstream network nodes, target delay data, and forwarding, to the one or more downstream network nodes, the target delay data. Further, the processor is configured to receive, from at least one of the network coordinator or the one or more upstream network nodes, a message, and forward the message to the one or more downstream network nodes.

DETAILED DESCRIPTION

Figure 1:
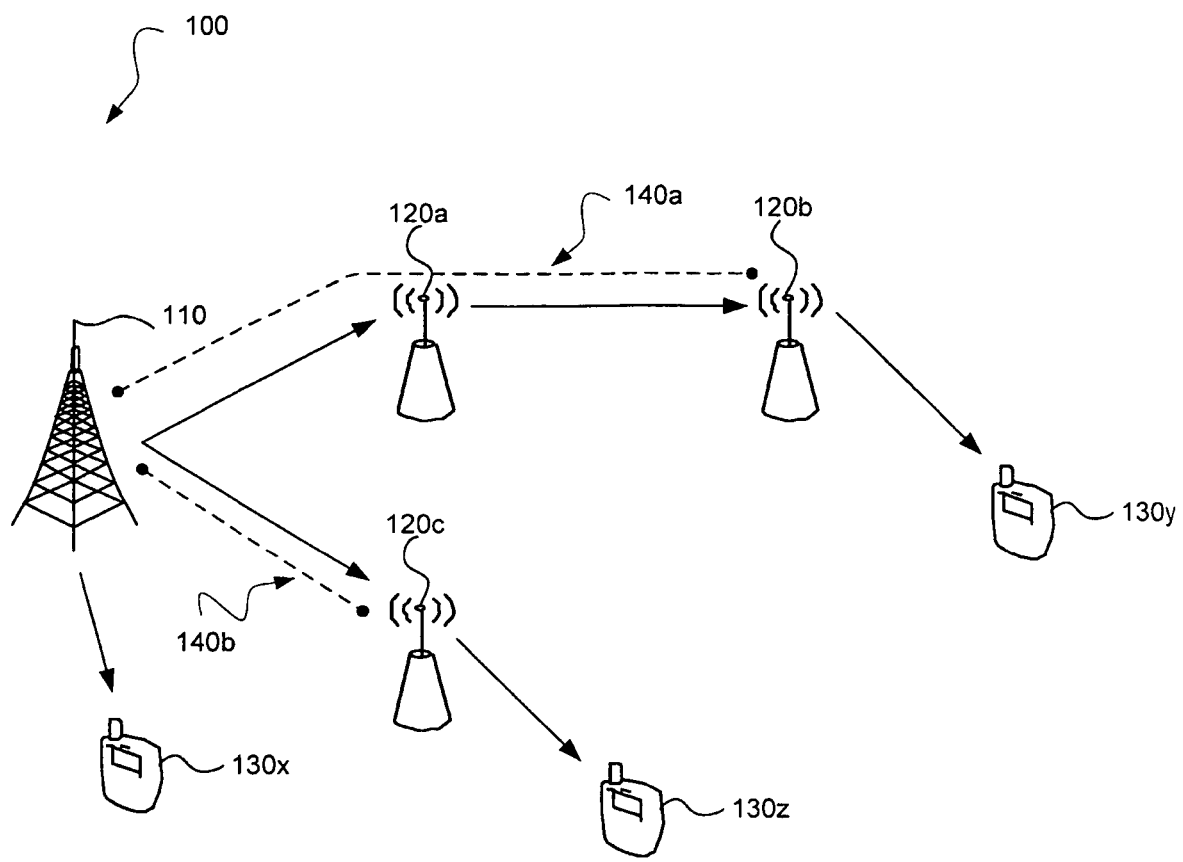
FIG. 1 is a block diagram of a conventional Multi-Hop Relay (MR) network.
Figure 2A:
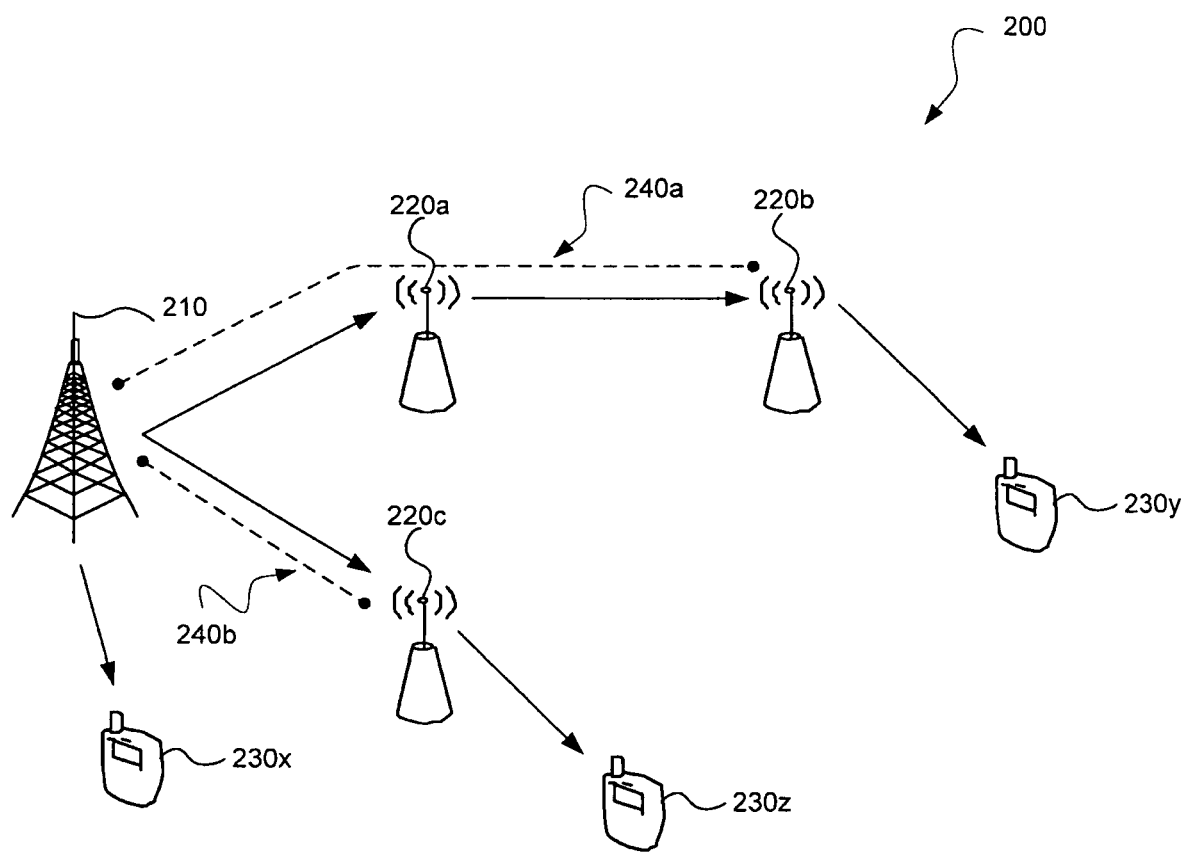
FIG. 2a is a block diagram of an exemplary Multi-Hop Relay (MR) network, consistent with certain disclosed embodiments.

FIG. 2a is a diagram of an exemplary MR network 200, consistent with certain disclosed embodiments. While the discussion of FIG. 2a will be made with reference to the Institute of Electrical and Electronics Engineers (IEEE) 802.16 family of standards, it is to be understood that the systems and methods disclosed herein may be used in any type of network having a plurality of nodes. Further, as illustrated and more fully described below, MR network 200 may include elements configured to function in accordance with embodiments of the invention.

As shown in FIG. 2a, MR network 200 may include one or more transmitters, e.g., base station (BS) 210, one or more relay stations (RS) 220, including RSs 220a, 220b, and 220c, one or more subscriber stations (SS) 230, including SSs 230x, 230y, and 230z, and one or more transmission paths (TP) 240, including TPs 240a and 240b.

BS 210 may be any type of communication device configured to transmit and/or receive data and/or communications based on one or more wireless standards, many of which are known in the art. For example, BS 210 may be configured to communicate with one or more SSs 230, RSs 220, other BSs 210, and/or other networks (not shown) using the communication protocols defined by any type of standard including, for example, the IEEE 802.16 family of standards. In some embodiments, BS 210 may also be referred to as, for example, a Node-B, a base transceiver system (BTS), an access point, etc. In one exemplary embodiment, BS 210 may function as a network coordinator, and may manage the collection, calculation, and communication of delay data and other network information.

Figure 2B:
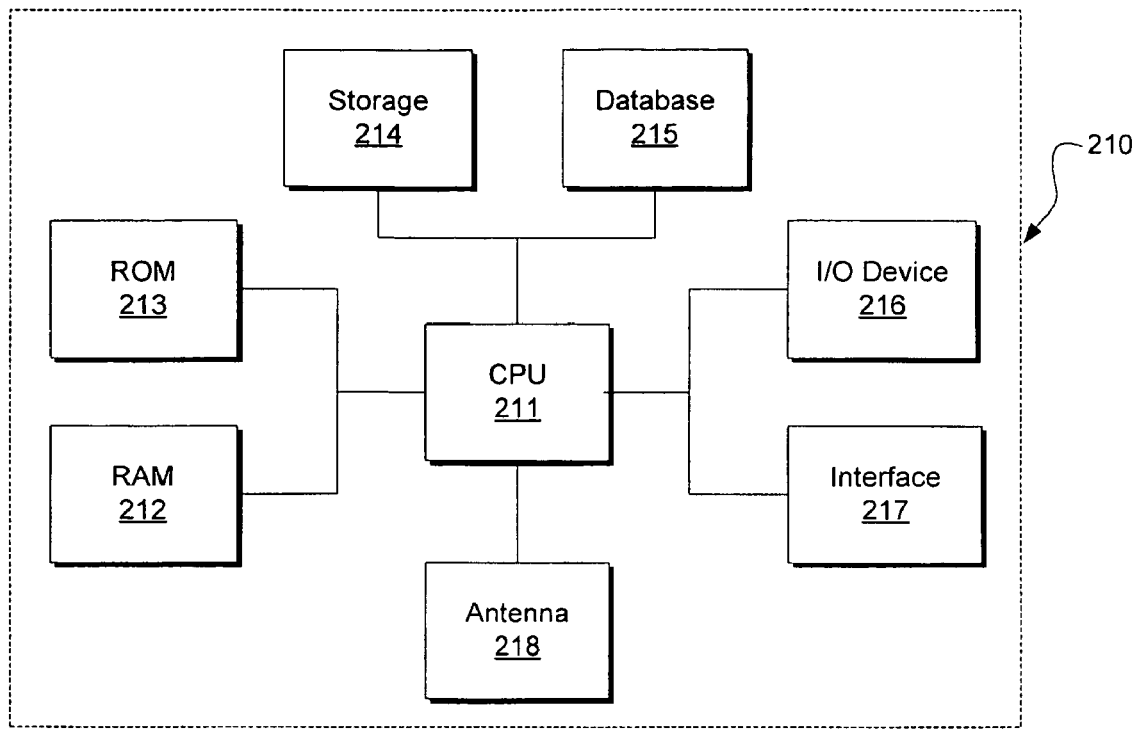
FIG. 2b is a block diagram of an exemplary Base Station (BS), consistent with certain disclosed embodiments.

FIG. 2b is a block diagram of an exemplary BS 210. As shown in FIG. 2b, BS 210 may include one or more of the following components: at least one central processing unit (CPU) 211 configured to execute computer program instructions to perform various processes and methods, random access memory (RAM) 212 and read only memory (ROM) 213 configured to access and store information and computer program instructions, memory 214 to store data and information, one or more databases 215 to store tables, lists, or other data structures, one or more I/O devices 216, one or more interfaces 217, one or more antennas 218, etc. Each of these components is well-known in the art and will not be discussed further.

RS 220 may be any type of communication device configured to transmit to and/or receive data and/or communications from one or more SSs 230, other RSs 220, and/or BSs 210 using the communication protocols defined by one or more wireless standards including, for example, the IEEE 802.16 family of standards.

Figure 2C:
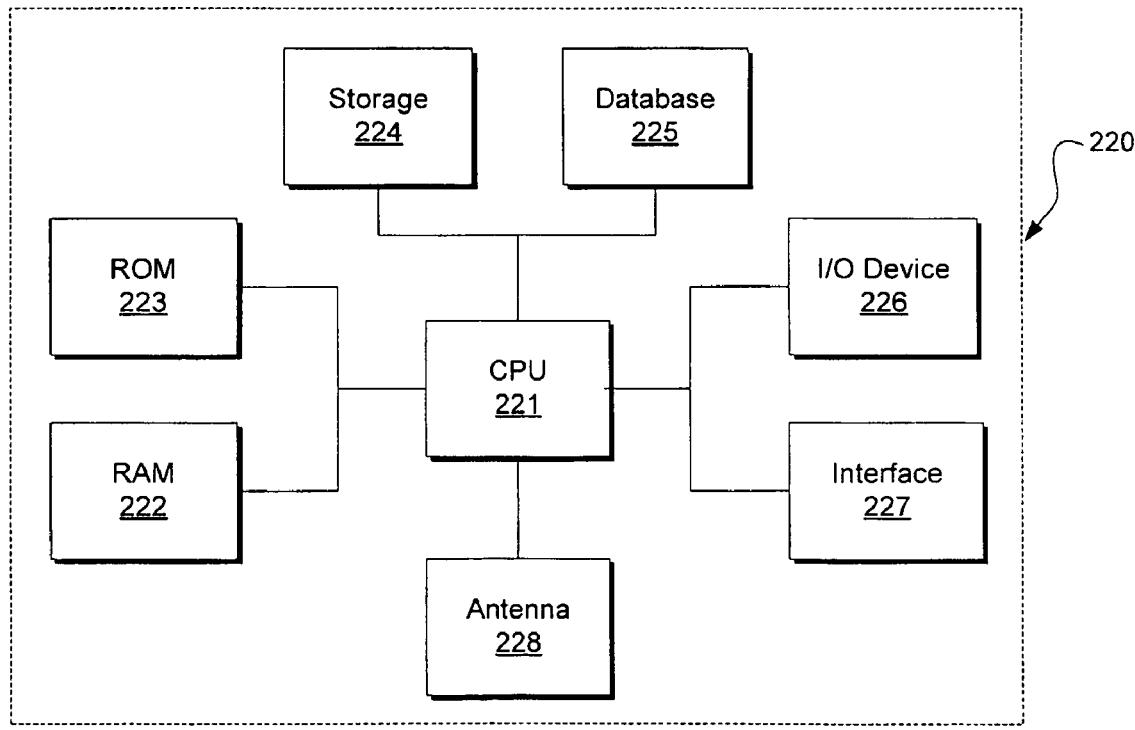
FIG. 2c is a block diagram of an exemplary Relay Station (RS), consistent with certain disclosed embodiments.

FIG. 2c is block diagram of an exemplary RS 220. As shown in FIG. 2c, RS 220 may include one or more of the following components: at least one central processing unit (CPU) 221 configured to execute computer program instructions to perform various processes and methods, random access memory (RAM) 222 and read only memory (ROM) 223 configured to access and store information and computer program instructions, memory 224 to store data and information, one or more databases 225 to store tables, lists, or other data structures, one or more I/O devices 226, one or more interfaces 227, one or more antennas 228, etc. Each of these components is well-known in the art and will not be discussed further.

SS 230 may include any type of wireless client device configured to communicate with BSs 210, RSs 220, and/or other SSs 230 using one or more wireless communication standards including, for example, the IEEE 802.16 family of standards. SSs 230 may include, for example, servers, clients, mainframes, desktop computers, laptop computers, network computers, workstations, personal digital assistants (PDA), tablet PCs, scanners, telephony devices, pagers, cameras, musical devices, etc. In one exemplary embodiment, SS 230 may be a mobile computing device. In other embodiments, SS 230 may be a "non-mobile" computing device located in a mobile environment (e.g., airplanes, watercraft, buses, multi-passenger vehicles, automobiles, etc.).

Figure 2D:
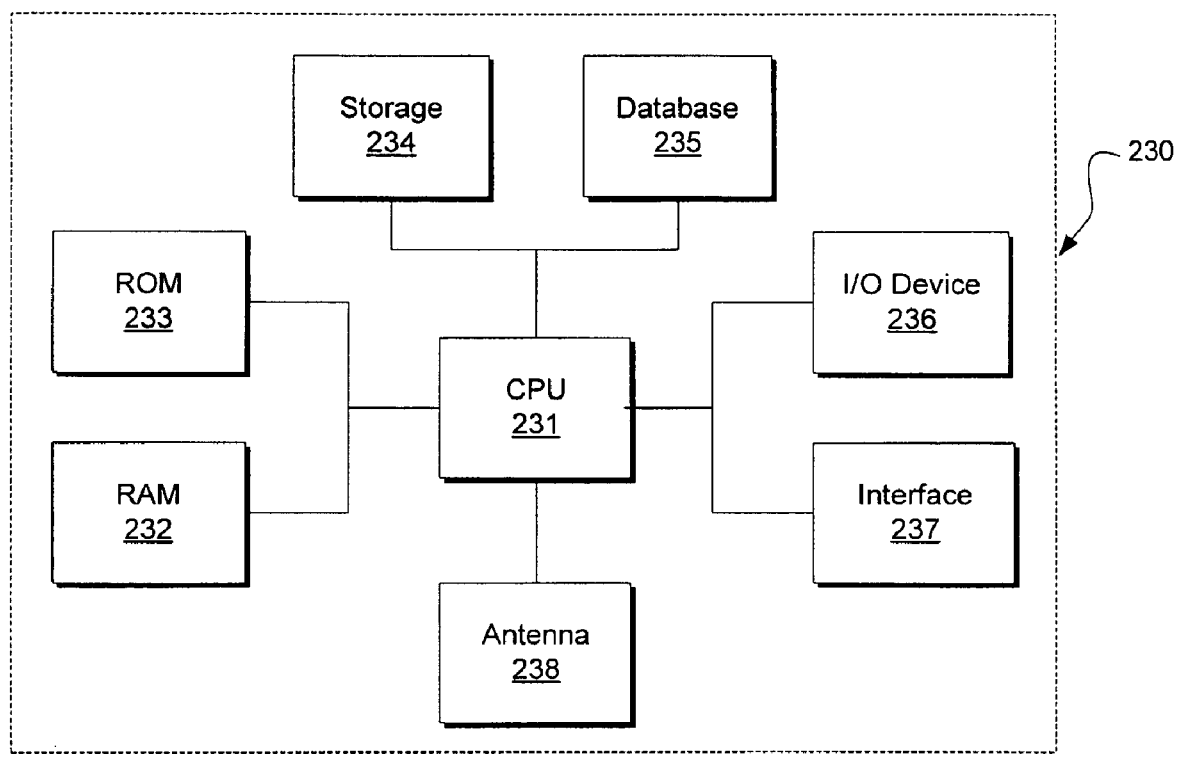
FIG. 2d is a block diagram of an exemplary Subscriber Station (SS), consistent with certain disclosed embodiments.

FIG. 2d is a block diagram of an exemplary SS 230. As shown in FIG. 2d, SS 230 may include one or more of the following components: at least one central processing unit (CPU) 231 configured to execute computer program instructions to perform various processes and methods, random access memory (RAM) 232 and read only memory (ROM) 233 configured to access and store information and computer program instructions, memory 234 to store data and information, one or more databases 235 to store tables, lists, or other data structures, one or more I/O devices 236, one or more interfaces 237, one or more antennas 238, etc. Each of these components is well-known in the art and will not be discussed further.

TP 240 may be a transmission path, including one or more nodes in MR network 200. TP 240 may be wired, wireless, or any combination of wired and/or wireless communication devices and/or methods. TP 240 may include one or more RSs 220 through which data and/or communications may be relayed from BS 210 to one or more SSs 230 and/or from one or more SSs 230 to BS 210. Communication from SS 230 to BS 210 may be said to be traveling upstream along TP 240, whereas communications from BS 210 to SS 230 may be said to be traveling downstream along TP 240. As a communication travels upstream along TP 240, each RS 220 may relay the communication to the next upstream node, which may be another RS 220 or BS 210. Similarly, as a communication travels downstream along TP 240, each RS 220 may relay the communication to the next downstream node, and the last downstream RS 220 may relay the communication to one or more SSs 230. In one exemplary embodiment, the first RS 220 receiving data and/or communication from BS 210 in a TP 240 may be referred to as an initial network node.

In one exemplary embodiment, each TP 240 may include one access node. An access node may be a terminating RS 220 in TP 240. That is, an access node may be the RS 220 that provides service to one or more SSs 230. In one exemplary embodiment, access node RS 220 may transmit to one or more SSs 230 and/or receive transmissions from one or more SSs 230. For example, access node RS 220 may receive data from upstream node, such as another RS 220, or BS 210, and relay the data to one or more SSs 230. Similarly, in the reverse direction, access node RS 220 may receive data from one or more SSs 230, and relay the data to an upstream node, such as another RS 220 or BS 210.

In addition, RS 220 may serve as an intermediate node in TP 240 between one or more RSs 220 and/or BSs 210. An intermediate node may be an RS 220 that relays data from an upstream node, such as RS 220, or BS 210 to one or more downstream nodes RS 220, and/or relays data from one or more downstream nodes RS 220 to an upstream node, such as RS 220 or BS 210. In one exemplary embodiment, RS 220 may serve as both an access node for one TP 240 and as an intermediate node for one or more additional TPs 240.

Referring again to FIG. 2a, BS 210 may be configured to create and store one or more data structures associated with one or more RSs 220, one or more SSs 230, and/or one or more TPs 240 in MR network 200, as well as relationships between the data. For example, BS 210 may store one or more relay node identifiers; one or more subscriber station identifiers; one or more transmission path identifiers; and/or one or more transmission path data structures, which may include one or more relay node identifiers associated with the relay nodes comprising the transmission path, the order of the relay nodes in the transmission path, etc.

In one exemplary embodiment, the one or more relay node identifiers may be used to uniquely identify each RS 220 in MR network 200. In another exemplary embodiment, the one or more subscriber station identifiers may be used to uniquely identify each SS 230 in MR network 200. In an additional embodiment, the one or more transmission path identifiers may be used to uniquely identify each TP 240 in network 200, as well as the nodes corresponding to TP 240 (e.g., BS 210, one or more RSs 220, one or more SSs 230, etc.).

In addition, BS 210 may store other parameters, such as, for example, transmission parameters related to one or more TPs 240, transmission parameters related to one or more RSs 220, transmission parameters related to one or more SSs 230, etc. In one exemplary embodiment, the transmission parameters related to one or more RSs 220 may include various delay times associated with RSs 220, including delay times such as queuing delays, processing delays, scheduling delays, etc.

As shown in FIG. 2a, communication between BS 210 and SS 230y may occur via TP 240a, which may include RS 220a and RS 220b. In TP 240a, data may be transmitted downstream from BS 210 to RS 220a, relayed downstream from RS 220a to RS 220b, and transmitted from RS 220b to SS 230y. Data may also be transmitted from SS 230y to RS 220b, relayed upstream from RS 220b to RS 220a, and transmitted upstream by RS 220a to BS 210. In this example, RS 220a may function as an intermediate node in TP 240a, and RS 220b may function as the access node in TP 240a.

Similarly, communication between BS 210 and SS 230z may occur via TP 240b. As shown in FIG. 2a, TP 240b may include RS 220c. In TP 240b, data may be transmitted downstream from BS 210 to RS 220c, and transmitted from RS 220c to SS 230z. Data may also be transmitted from SS 230z to RS 220c, and transmitted upstream from RS 220c to BS 210. In this example, RS 220c may function as the access node in TP 240b, and TP 240b may contain no intermediate nodes.

Communication between BS 210 and SS 230z may not utilize any RSs 220, and TP 240 may include only the transmission path between BS 210 and SS 230z. As such, data may be transmitted from BS 210 to SS 230z, and from SS 230z to BS 210.

An exemplary embodiment consistent with this disclosure may include two phases: a synchronization phase and a synchronous transmission phase. During the synchronization phase, target delay data may be calculated and disseminated to access nodes RS 220. During the synchronous transmission phase, access nodes RS 220 may utilize the target delay data to achieve synchronous transmission. During the synchronous transmission phase, multiple synchronous transmissions may occur that utilize the same target delay data.

The synchronization phase may include a collection step, a calculation step, and a dissemination step. In the collection step, delay data may be collected from each RS 220. The delay data may represent the total time between a given RS 220's receipt of data and the RS 220's subsequent transmission of the data to one or more SSs 230 and/or RSs 220. The calculation step may include two sub-steps: calculation of one or more transmission path delays and calculation of target delay data. In the dissemination step, the target delay data may be disseminated to each access node RS 220.

Figure 3A:
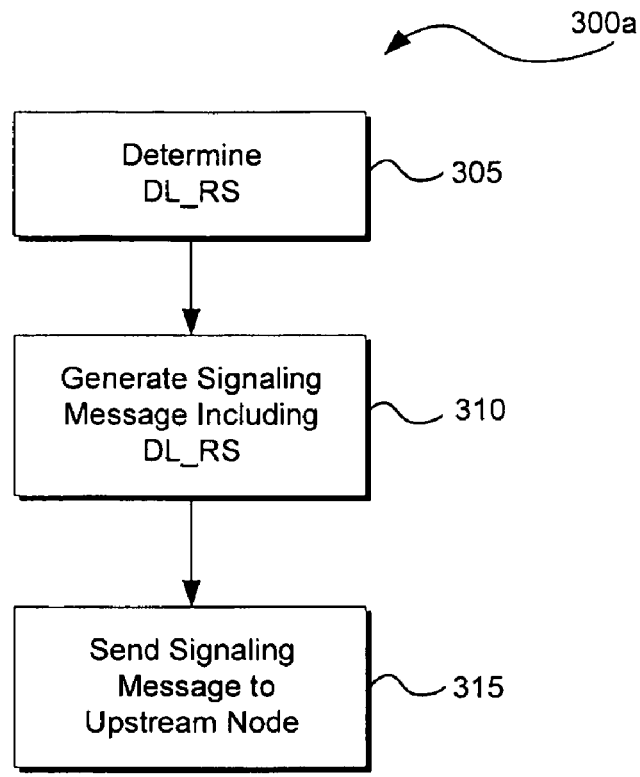
FIG. 3a is a flow chart illustrating an exemplary communication of delay information in a Transmission Path (TP), consistent with certain disclosed embodiments.
Figure 3B:
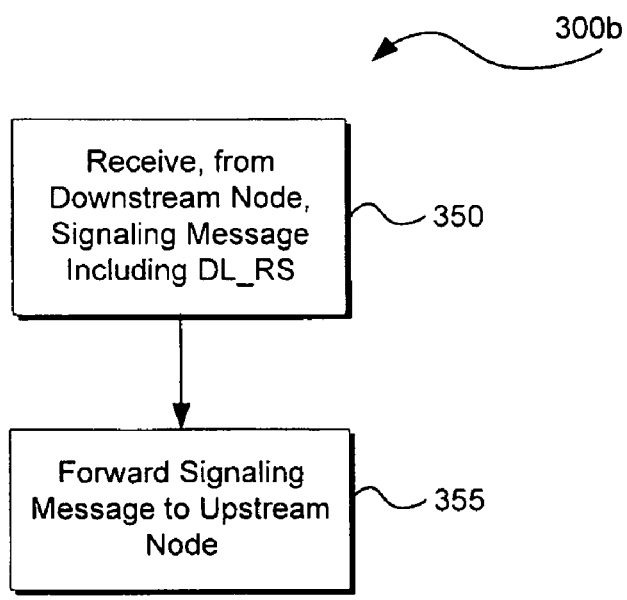
FIG. 3b is a flow chart illustrating an exemplary communication of delay information in a TP, consistent with certain disclosed embodiments.
Figure 4:
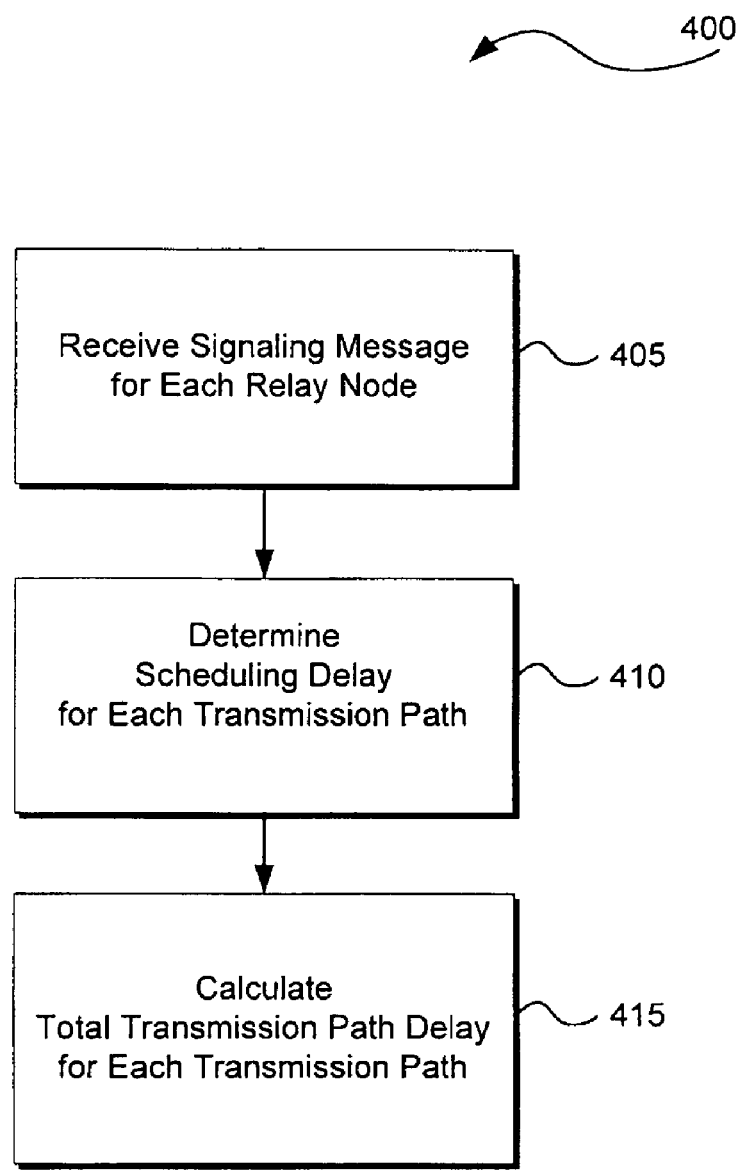
FIG. 4 is a flow chart illustrating an exemplary centralized collection and calculation of delay information in a TP, consistent with certain disclosed embodiments.

FIGS. 3a, 3b and 4 illustrate centralized collection and calculation of delay information, consistent with certain disclosed embodiments. As shown in FIGS. 3a, 3b, and 4, each RS 220 may report its individual delay data to BS 210 via its associated TP 240. BS 210 may calculate a total transmission path delay for each TP 240 based on the delay data received from each RS 220.

FIG. 3a is an exemplary flowchart 300a illustrating reporting of delay information by RS 220, consistent with certain disclosed embodiments. RS 220 may determine its delay data, DL_RS (step 305). As used herein, DL_RS may represent the total time between when RS 220 receives a message and when the same RS 220 transmits the message. In one exemplary embodiment, DL_RS may include a scheduling delay, a queuing delay, and/or a processing delay. Delay data may be determined for RS 220 using any combination of methods. For example, in one embodiment, BS 210 may determine the delay data by sending a test message to one or more RSs 220 and measuring the delay. In another exemplary embodiment, BS 210 may estimate the delay from one or more previous data transmissions between BS 210 and one or more RSs 220. According to another exemplary embodiment, RS 220 may have a known processing delay (e.g., one or more hardware device parameters, etc.), and the delay data may include the known processing delay. In a further exemplary embodiment, the delay data may be computed based on observation and/or estimation of a wait time associated with data in queue or may be based on a wait time before a scheduled transmission from a scheduler.

RS 220 may determine its delay time in response to a number of triggers. For example, RS 220 may be programmed to determine and report its delay time according to one or more periodic time increments. As another example, RS 220 may determine and report its delay time in response to a request from BS 210. As an additional example, RS 220 may continually monitor its delay time and notify BS 210 when there is a change in the monitored delay time.

RS 220 may generate a signaling message, and the signaling message may include DL_RS (step 310). In one exemplary embodiment, an SBC_REQ message may be used to perform the methods described herein. In other embodiments, other types of signaling messages may be used.

RS 220 may report its delay data to BS 210 by sending the message to an upstream node in TP 240 (step 315). The upstream node may be BS 210 or another RS 220. For example, RS 220 may report its delay data to an upstream intermediate node RS 220, which may relay the delay data to the next upstream node. The next upstream node may include, for example, another RS 220 or BS 210.

FIG. 3b is an exemplary flowchart 300b illustrating the relaying of delay information by intermediate node RS 220, consistent with certain disclosed embodiments. Intermediate node RS 220 may function to relay data from each downstream node RS 220 to the next upstream node. The next upstream node may include, for example, another RS 220 or BS 210.

As shown in FIG. 3b, intermediate node RS 220 may receive a signaling message from downstream node RS 220 (step 350). The signaling message may include delay data DL_RS associated with downstream node RS 220.

Intermediate node RS 220 may forward the received signaling message to the upstream node RS 220 in TP 240 or to BS 210 (step 355). In one exemplary embodiment, each intermediate node RS 220 may relay delay data associated with each downstream node RS 220 for which it functions as an intermediate node.

For example, returning to FIG. 2a, RSs 220a, 220b, and 220c may each determine and report their delay data to an upstream node. RSs 220a and 220c may each send their delay data directly to BS 210, and RS 220b may send its delay data to intermediate node RS 220a. Since RS 220a also functions as an intermediate node in TP 240a, RS 220a may receive a signaling message from RS 220b, containing delay data associated with RS 220b, and forward the signaling message to BS 210.

FIG. 4 is an exemplary flowchart 400 illustrating a centralized collection and calculation of delay information by BS 210, consistent with certain embodiments. BS 210 may receive a signaling message from each RS 220 via its respective TP 240 (step 405). As discussed above in connection with step 310 of FIG. 3a, each signaling message may include delay data DL_RS associated with an RS 220.

Upon receipt of the signaling messages, BS 210 may determine a delay value for each TP 240 (step 410). BS 210 may calculate a total transmission path delay for each TP 240 based on the delay value associated with each TP 240 (step 415). For example, a total transmission path delay for TP 240 may be the sum of one or more processing delays associated with each node in TP 240, one or more scheduling delays associated with each node in TP 240, and one or more queuing delays associated with each node in TP 240. The total transmission path delay may be the difference between the time at which a message is transmitted from BS 210 and the time at which the message is transmitted from the access node in TP 240 to one or more SSs 230. Alternatively, the total transmission path delay for TP 240 may be greater than the sum of one or more processing delays associated with each node in TP 240, one or more scheduling delays associated with each node in TP 240, and one or more queuing delays associated with each node in TP 240. For example, the sum of one or more processing delays associated with each node in TP 240, one or more scheduling delays associated with each node in TP 240, and one or more queuing delays associated with each node in TP 240 may be calculated, and BS 210 may then add an additional time value to generate the total transmission path delay. The additional time value may be an arbitrary value or it may be a predetermined value (e.g., static value, ratio of values, percentage of the sum of delays, etc.).

Referring again to FIG. 2a, BS 210 may receive two distinct signaling messages from RS 220a: one containing delay data for RS 220a and one containing delay data for RS 220b. BS 210 may also receive from RS 220c a signaling message containing delay data for RS 220c. BS 210 may determine a scheduling delay for TP 240a and a scheduling delay for TP 240b. BS 210 may calculate a total transmission path delay for TP 240a, based on delay data from RSs 220a and 220b and the scheduling delay for TP 240a. BS 210 may calculate a total transmission path delay for TP 240b, based on delay data from RS 220c and the scheduling delay for TP 240b.

Figure 5:
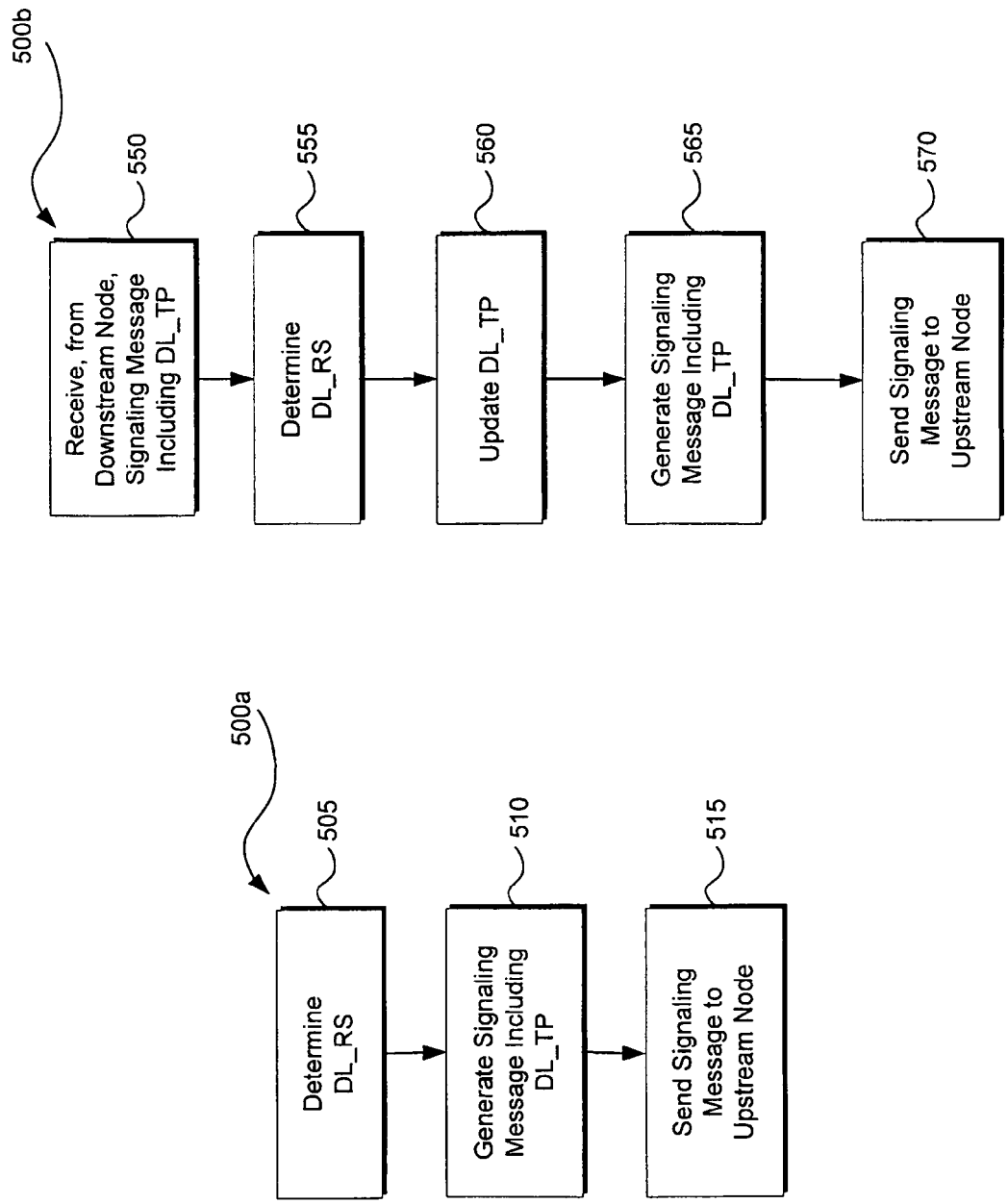
FIG. 5a is a flow chart illustrating an exemplary communication of delay information in a TP, consistent with certain disclosed embodiments.
FIG. 5b is a flow chart illustrating an exemplary communication of delay information in a TP, consistent with certain disclosed embodiments.
Figure 6:
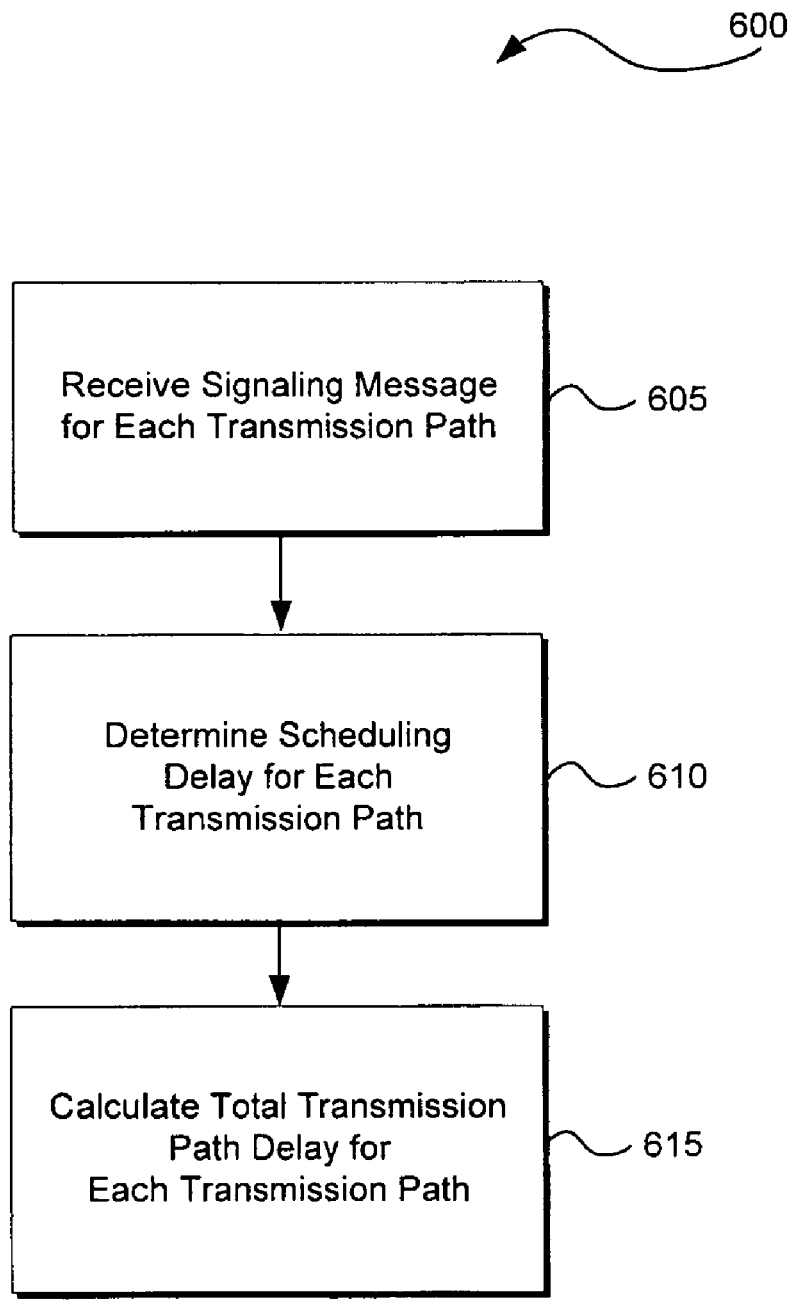
FIG. 6 is a flow chart illustrating an exemplary distributed collection and calculation of delay information in a TP, consistent with certain disclosed embodiments.

FIGS. 5a, 5b and 6 each illustrate distributed collection and calculation of delay information, consistent with certain disclosed embodiments. As shown in FIGS. 5a, 5b, and 6, each access RS 220 may report its individual delay data as a current transmission path delay value to an upstream node, RS 220, or BS 210. If the upstream node is a relay station RS 220, the upstream node RS 220 may update the current transmission path delay value to include its delay data, and may report the updated current transmission path delay value to another upstream node, RS 220, or BS 210. In this manner, BS 210 may receive a transmission path delay value for each TP 240.

FIG. 5a is an exemplary flowchart 500a illustrating reporting of delay information by an access node RS 220, consistent with certain disclosed embodiments. Access node RS 220 may determine its delay data DL_RS (step 505). DL_RS may represent the total time between when RS 220 receives a message and when RS 220 transmits the message. In one exemplary embodiment, DL_RS may include a scheduling delay, a queuing delay, and/or a processing delay. As discussed above in connection with FIG. 3a, RS 220 may determine its delay time in response to any number of triggers. For example, RS 220 may be programmed to determine and report its delay time according to a periodic time increment. As another example, RS 220 may determine and report its delay time in response to a request from BS 210. As an additional example, RS 220 may continually monitor its delay time, and may notify BS 210 in response to a change in its delay time.

Access node RS 220 may generate a signaling message, including a current transmission path delay value, DL_TP (step 510). In one exemplary embodiment, DL_TP may be equal to DL_RS.

Access node RS 220 may send the signaling message to the next upstream node in TP 240 (step 515). The next upstream node may include, for example, another RS 220 or BS 210. In one exemplary embodiment, RS 220 may report a current DL_TP value to an upstream intermediate node RS 220, which may further update DL_RS before sending it to the next upstream node.

FIG. 5b is an exemplary flowchart 500b illustrating relaying and updating of delay information by an intermediate node RS 220, consistent with certain disclosed embodiments. Intermediate node RS 220 may receive from a downstream node RS 220 a signaling message including a current transmission path delay value, DL_TP (step 550). Intermediate node RS 220 may determine its delay data, DL_RS (step 555). Intermediate node RS 220 may update DL_TP to include its delay data (step 560). In one exemplary embodiment, intermediate node RS 220 may add its delay time to DL_TP.

Intermediate node RS 220 may generate a signaling message (e.g., an SBC_REQ message, etc.) (step 565). In one exemplary embodiment, the signaling message may include the updated DL_TP. Intermediate node RS 220 may send the signaling message to upstream node, RS 220, or BS 210 in transmission path TP 240 (step 570). In one exemplary embodiment, each intermediate node RS 220 may receive a distinct DL_TP value from each downstream node RS 220 for which it functions as an intermediate node. In addition, each RS 220 may update the DL_TP value to include its delay data, and may forward the updated DL_TP value to the next upstream node. The next upstream node may include, for example, another RS 220 or BS 210.

For example, referring to FIG. 2*a*, RS 220*b* may relay a DL_TP value to RS 220*a*, the DL_TP value associated with TP 240*a*. The DL_TP value sent from RS 220*b* may include the DL_RS for RS 220*b*. RS 220*a* may then add the DL_RS for RS 220*a* to the DL_TP value for TP 240*a*, and send the updated DL_TP value to BS 210. Similarly, RS 220*c* may report a DL_TP value to BS 210 for TP 240*b*. The DL_TP value for TP 240*b* may include only the DL_RS value for RS 220*c*.

FIG. 6 is an exemplary flowchart 600 illustrating a distributed collection and calculation of delay information by BS 210, consistent with certain embodiments. As shown in FIG. 6, BS 210 may receive a signaling message from each TP 240 (step 605). As discussed above in connection with step 510 of FIG. 5*a*, each signaling message may include delay data DL_TP associated with a TP 240. For example, DL_TP for TP 240 may be the sum of the delay times associated with each RS 220 in TP 240. That is, DL_TP may be the difference between the time at which a message may be transmitted from BS 210 and the time at which the message may be transmitted from the access node RS 220 in TP 240 to one or more SSs 230.

BS 210 may then determine a scheduling delay for each transmission path (step 610). BS 210 may calculate a total transmission path delay for each TP 240 based on the delay data received from each TP 240 and the scheduling delay for each TP 240 (step 615). The total transmission path delay for TP 240 may include the delay data received from TP 240 plus the scheduling delay for TP 240. For example, referring to FIG. 2*a*, BS 210 may receive a signaling message from RS 220*a* containing DL_TP for TP 240*a*. BS 210 may also receive a signaling message from RS 220*c* containing DL_TP for TP 240*b*. Based on the data provided by the signaling messages, BS 210 may determine a scheduling delay for TP 240*a* and a scheduling delay for TP 240*b*.

Figure 7:
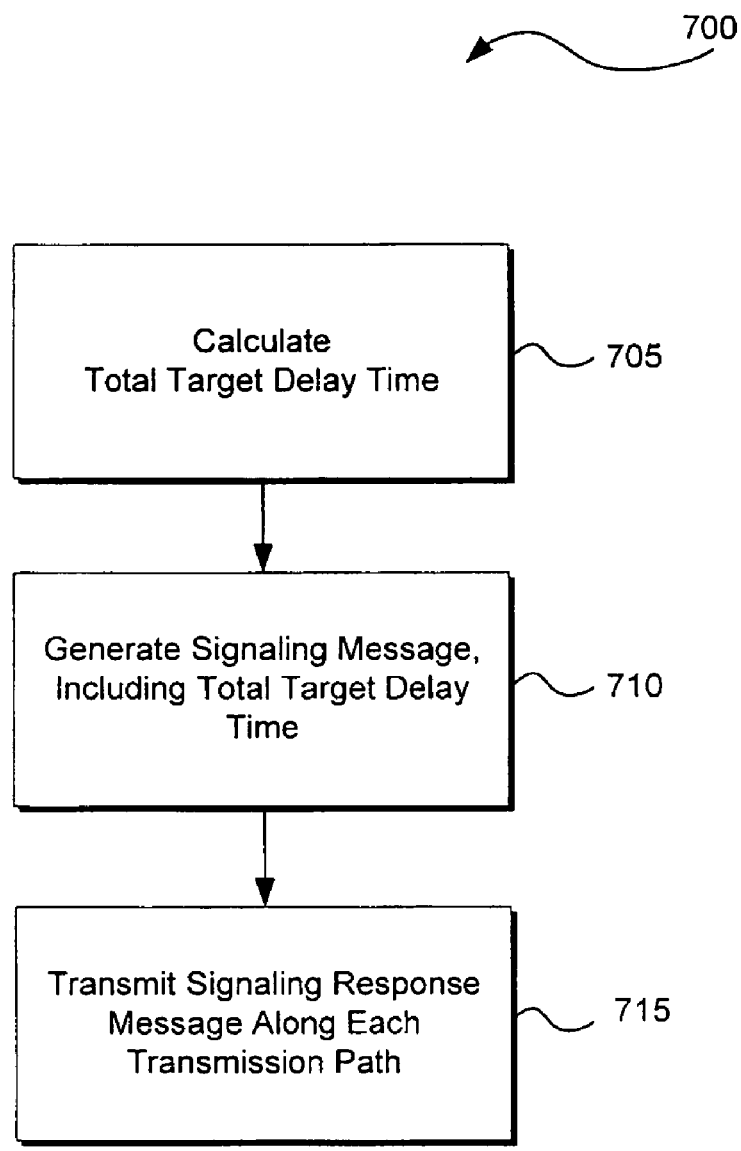
FIG. 7 is a flow chart illustrating an exemplary dissemination of delay information in a TP, consistent with certain disclosed embodiments.
Figure 8:
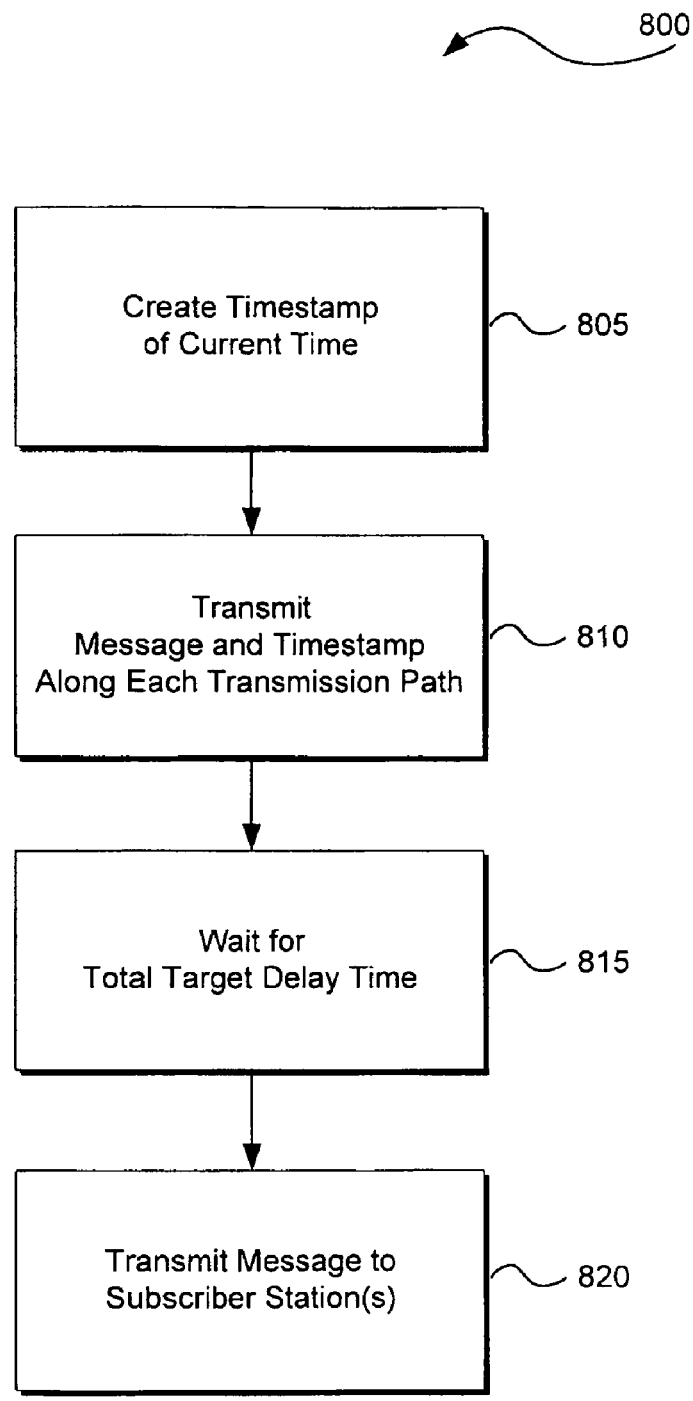
FIG. 8 is a flow chart illustrating an exemplary transmission of a message in a TP, consistent with certain disclosed embodiments.
Figure 9:
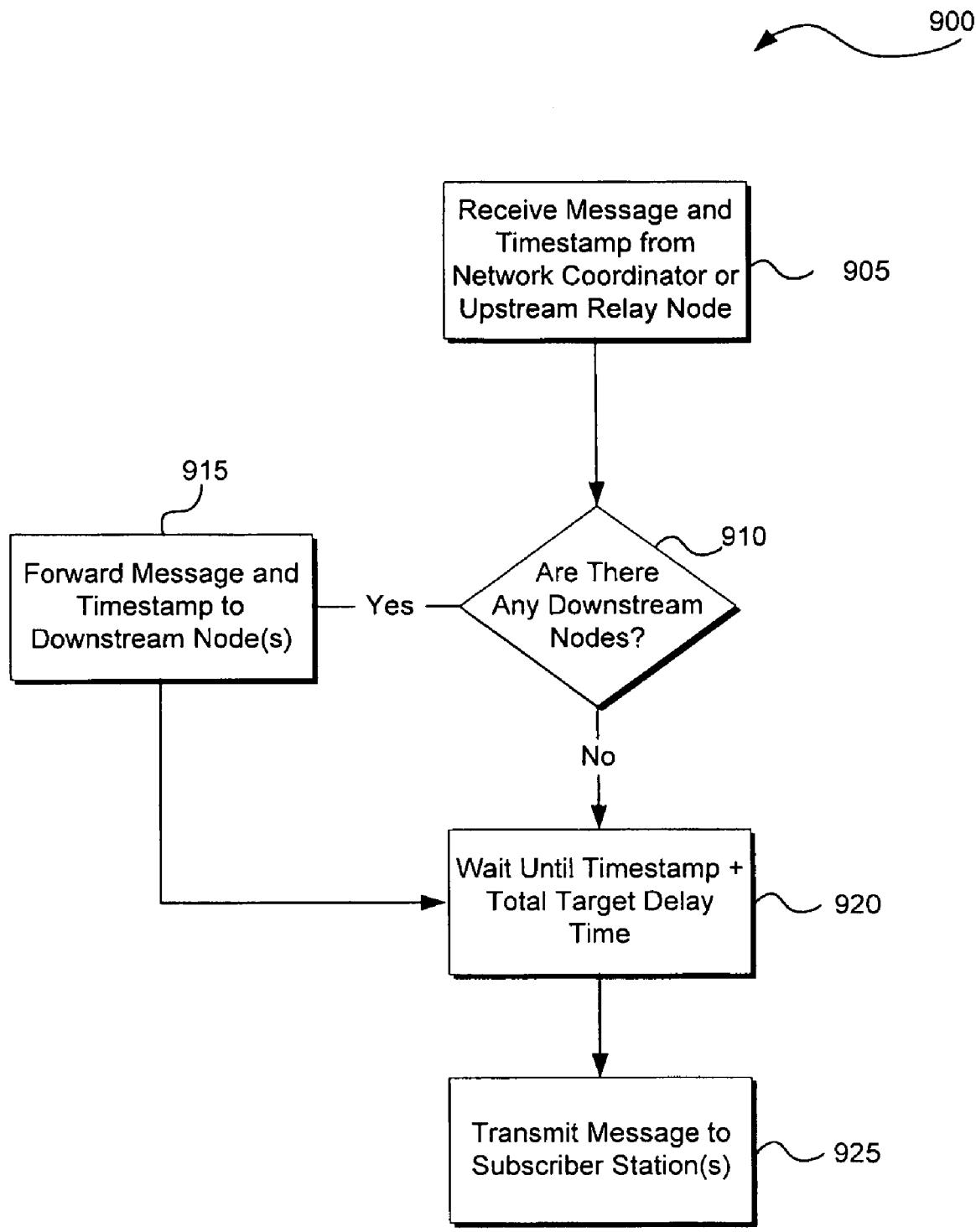
FIG. 9 is a flow chart illustrating an exemplary transmission of a message in a TP, consistent with certain disclosed embodiments.

FIGS. 7, 8, and 9 illustrate dissemination of the target delay data and synchronous message transmission employing the target delay data, consistent with certain embodiments. As shown in FIGS. 7, 8, and 9, the calculation of target delay data may include calculation of a single total target delay time. Synchronous transmission by access nodes RS 220 and BS 210 may be achieved by configuring BS 210 to transmit a message, along with a timestamp associated with the transmission time of the message, to access nodes RS 220 via their respective TPs 240. Access nodes RS 220, after receiving the message, and BS 210, after sending the message, may delay transmission of the message to SSs 230 until the total target delay time has elapsed after the timestamp of the message.

FIG. 7 is an exemplary flowchart 700 illustrating a dissemination of a total target delay time by BS 210, consistent with an exemplary embodiment employing timestamping. As shown in FIG. 7, BS 210 may calculate a total target delay time (step 705). For example, BS 210 may calculate the total target delay time as the maximum total transmission path delay for all TPs 240 in MR network 200.

BS 210 may generate a signaling response message including the total target delay time (step 710). In one exemplary embodiment, the signaling response message may be an SBC_RSP message. BS 210 may send the signaling response message to each access node RS 220 via its associated one or more TPs 240 (step 715). In addition, if BS 210 determines that the total target delay time has changed, BS 210 may initiate and send an updated total target delay time to each access node RS 220. Although not shown, each access node RS 220 may receive the signaling response message, including the total target delay time, and may store the total target delay time in memory for use in future transmissions.

FIG. 8 is an exemplary flowchart 800 illustrating a transmission of a message by BS 210, consistent with an exemplary embodiment employing timestamping. BS 210 may create a timestamp associated with the transmission time of the message (step 805). BS 210 may transmit the message and the timestamp along each TP 240 (step 810).

BS 210 may wait until the total target delay time has elapsed after the timestamp of the message (step 815). Once the total target delay time has elapsed, BS 210 may transmit the message to one or more SSs 230 communicating with BS 210 (step 820). In one exemplary embodiment, the timestamp may be included in the message. In another exemplary embodiment, BS 210 may send the message over a relay downlink as a pre-transmission frame, and may separately transmit the timestamp over the relay link. BS 210 may subsequently send the message over the access link to one or more RSs 220. Each RS 220 in TP 240 may forward the message over a relay link to one or more downstream network nodes, RS 220. Once the BS 210 and each RS 220 has waited the total target delay time, BS 210 and RSs 220 may synchronously transmit the message to one or more SSs 230 over an access link.

FIG. 9 is an exemplary flowchart 900 illustrating a synchronous message transmission by an access node RS 220, consistent with an exemplary embodiment employing timestamping. Access node RS 220 may receive the message and timestamp from an upstream node, such as, for example, another RS 220 or BS 210 (step 905). If access node RS 220 also serves as an intermediate node for one or more downstream RSs 220 in one or more TPs 240 (step 910), access node RS 220 may forward the message and timestamp to the one or more downstream nodes RSs 220 (step 915). In one exemplary embodiment, RS 220 may forward the message and timestamp together (e.g., in a single data frame). In another exemplary embodiment, RS 210 may forward the message over a relay downlink as a pre-transmission frame, and may separately transmit the timestamp over the relay link. Access node RS 220 may wait until the total target delay time has elapsed after the timestamp of the message (step 920), and then may transmit the message to one or more SSs 230 (step 925).

Referring again to FIG. 2*a*, BS 210 may, consistent with an exemplary embodiment employing timestamping, calculate a total target delay time. BS 210 may disseminate the total target delay time to all access nodes, e.g., RS 220*b* and RS 220*c*, by sending the total target delay time to RS 220*c* and RS 220*a*. Upon receipt of the delay information, RS 220*a* may relay the total target delay time to RS 220*b*.

For example, BS 210 may transmit an arbitrary number of messages for synchronous transmission using the disseminated total target delay time. Consistent with one exemplary embodiment, BS 210 may send a message and associated timestamp to RSs 220*a* and 220*c*. RS 220*a* may receive the message and timestamp, and forward the message and timestamp to RS 220*b*. RSs 220*b* and 220*c*, after receiving the message and timestamp, and BS 210, after sending the message, may wait until the total target delay time has elapsed after the timestamp of the message before transmitting the message to SSs 230*x*, 230*y*, and 230*z*. In one exemplary embodiment, transmission of the message to SSs 230*x*, 230*y*, and 230*z* may be simultaneous. In another exemplary embodiment, transmission of the message to SSs 230*x*, 230*y*, and 230*z* may be substantially simultaneous.

Figure 10:
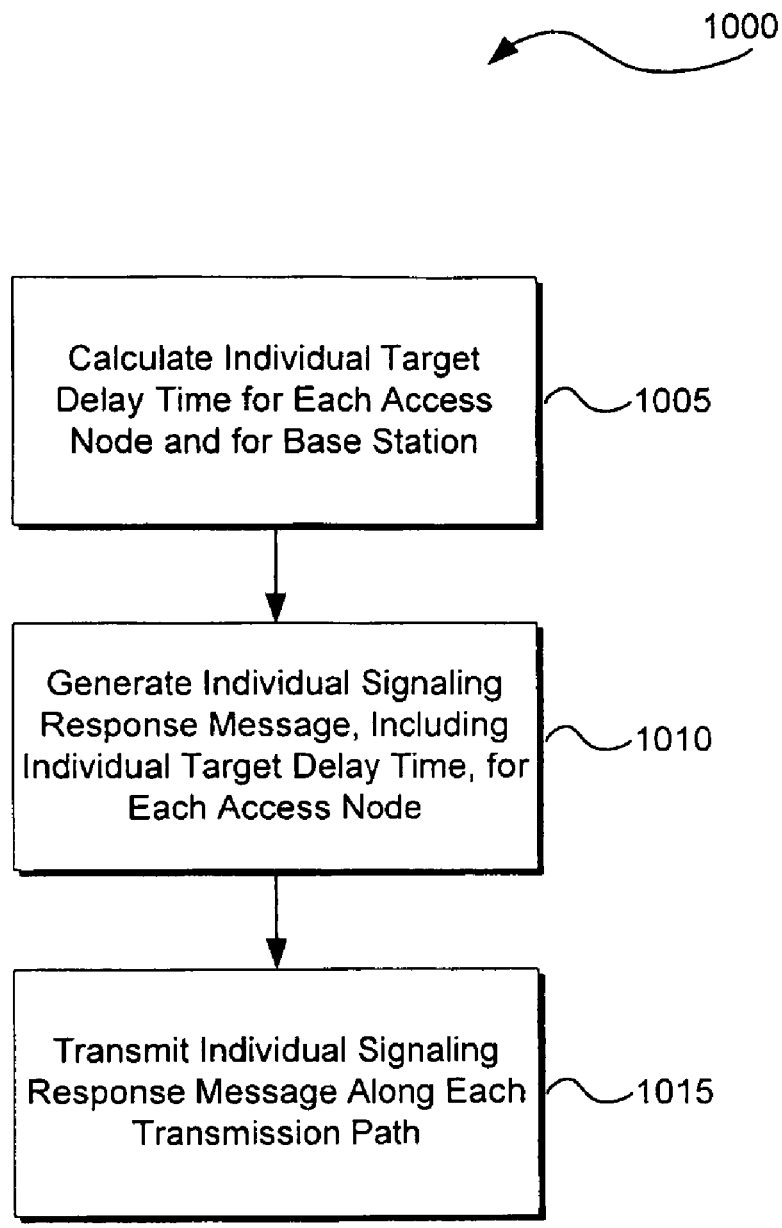
FIG. 10 is a flow chart illustrating an exemplary dissemination of delay information in a TP, consistent with certain disclosed embodiments.
Figure 11:
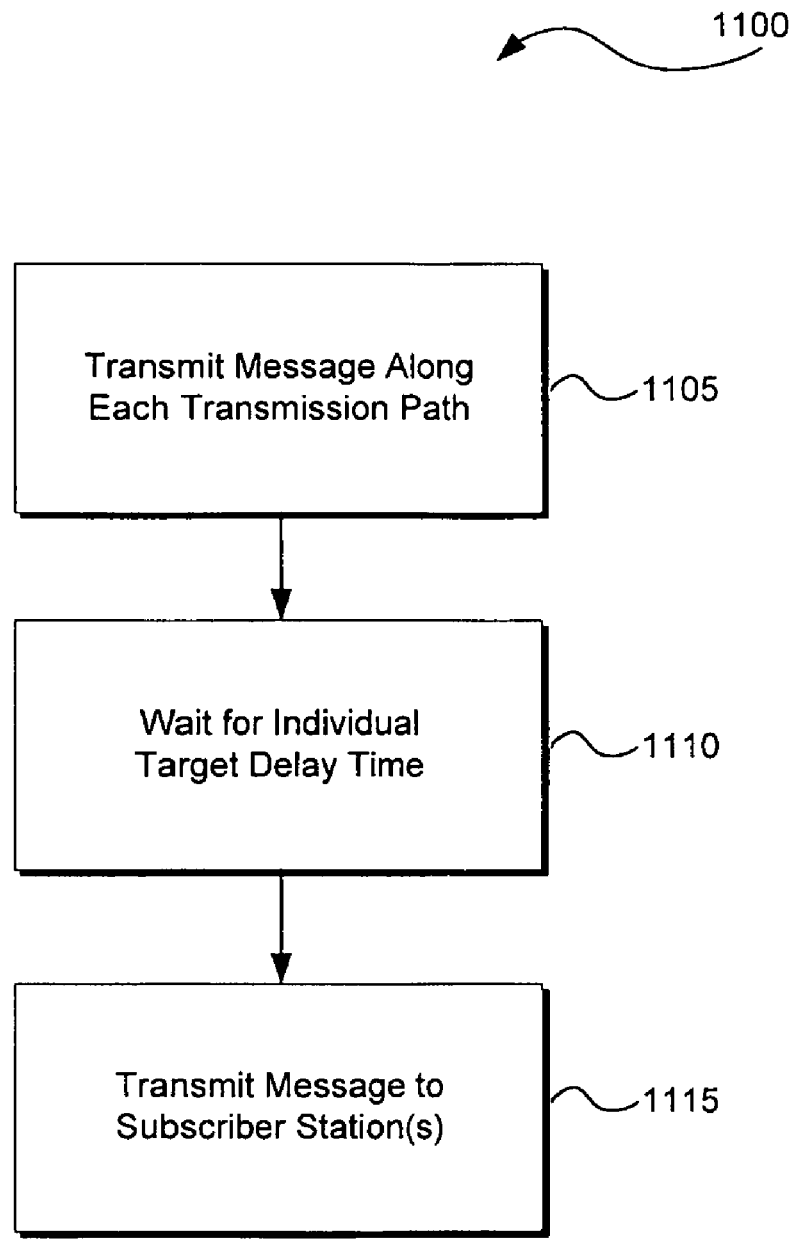
FIG. 11 is a flow chart illustrating an exemplary transmission of a message in a TP, consistent with certain disclosed embodiments.
Figure 12:
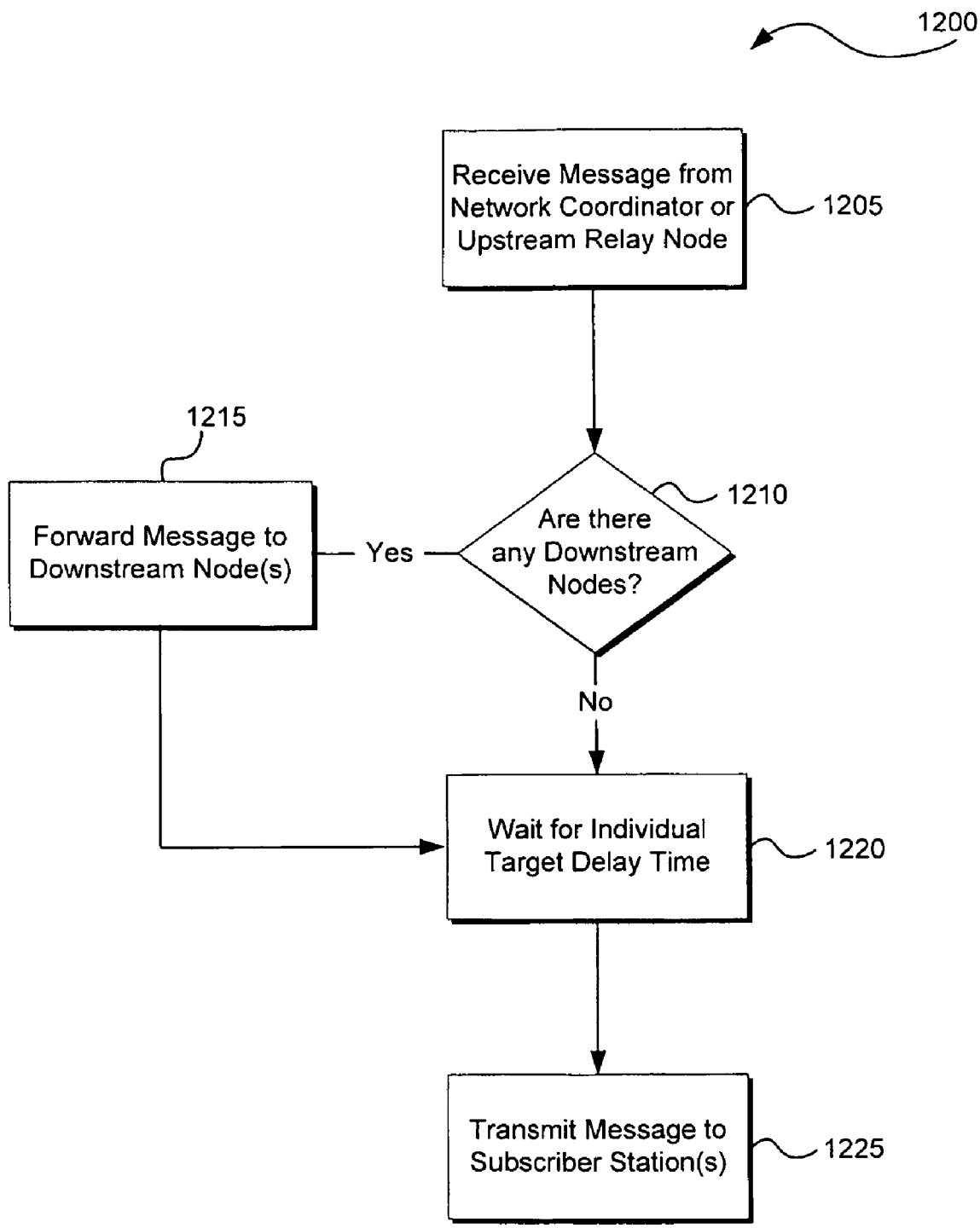
FIG. 12 is a flow chart illustrating an exemplary transmission of a message in a TP, consistent with certain disclosed embodiments.

FIGS. 10, 11, and 12 illustrate calculation of target delay data, dissemination of the target delay data, and synchronous message transmission employing the target delay data, consistent with certain embodiments. As shown in FIGS. 10, 11, and 12, the calculation of target delay data may include calculation of individual target delay times for each access node RS 220, as well as for BS 210. Synchronous transmission by access nodes RS 220 and BS 210 may be achieved by BS 210 transmitting a message to access nodes RS 220 via their respective TPs 240. Access nodes RS 220, after receiving the message, and BS 210, after sending the message, may delay transmission of the message to SSs 230 according to their respective, individual target delay times. That is, in some embodiments, the synchronous message transmission may not principally rely on timestamping.

FIG. 10 is an exemplary flowchart 1000 illustrating a dissemination of individual target delay times by BS 210, consistent with an exemplary embodiment without timestamping. As shown in FIG. 10, BS 210 may calculate an individual target delay time for each access node RS 220 and for itself (step 1005). For example, BS 210 may calculate an individual target delay time for a given TP 240 as the maximum total transmission path delay for all TPs 240 minus the total transmission path delay associated with the given TP 240. BS 210 may calculate an individual target delay time for BS 210 as the maximum transmission path delay of all TPs 240. Alternatively, individual target delay time for BS 210 may be greater than the maximum transmission path delay of all TPs 240. For example, the individual target delay time for BS 210 may be the maximum transmission path delay of all TPs 240 plus an additional time value. The additional time value may be an arbitrary value or it may be a predetermined value (e.g., static value, ratio of values, percentage of the sum of delays, etc.).

BS 210 may generate an individual signaling response message for each access node RS 220 including the individual target delay time (step 1010). In one exemplary embodiment, the signaling response message may be an SBC_RSP message. BS 210 may send an individual signaling response message to each access node RS 220 via its associated one or more TPs 240 (step 1015).

In addition, if BS 210 determines that the total target delay time has changed, BS 210 may initiate and send an updated total target delay time to each access node RS 220. Although not shown, each access node RS 220, may receive the signaling response message, including its individual target delay time, and may store the individual target delay time in memory for use in future transmissions.

FIG. 11 is an exemplary flowchart 1100 illustrating a transmission of a message by BS 210, consistent with an exemplary embodiment without timestamping. As shown in FIG. 11, BS 210 may transmit a message along each TP 240 (step 1105). BS 210 may also wait for its individual target delay time (step 1110), and then may transmit the message to one or more SSs 230 (step 1115).

In one exemplary embodiment, BS 210 may send the data over a relay downlink as a pre-transmission frame. Each RS 220 in TP 240 may forward the data over the relay link to one or more downstream network nodes, RS 220. Once the BS 210 and each RS 220 has waited the total target delay time, BS 210 and RSs 220 may synchronously transmit the data over an access link.

FIG. 12 is an exemplary flowchart 1200 illustrating a synchronous message transmission by an access node RS 220, consistent with an exemplary embodiment without timestamping. Access node RS 220 may receive the message from an upstream node, such as another RS 220 or BS 210 (step 1205). If access node RS 220 also serves as an intermediate node for one or more downstream RSs 220 in one or more TPs 240 (step 1210), access node RS 220 may forward the message to the one or more downstream nodes RSs 220 (step 1215). Access node RS 220 may wait for its individual target delay time (step 1220), and then may transmit the message to one or more SSs 230 (step 1225).

Figure 13:
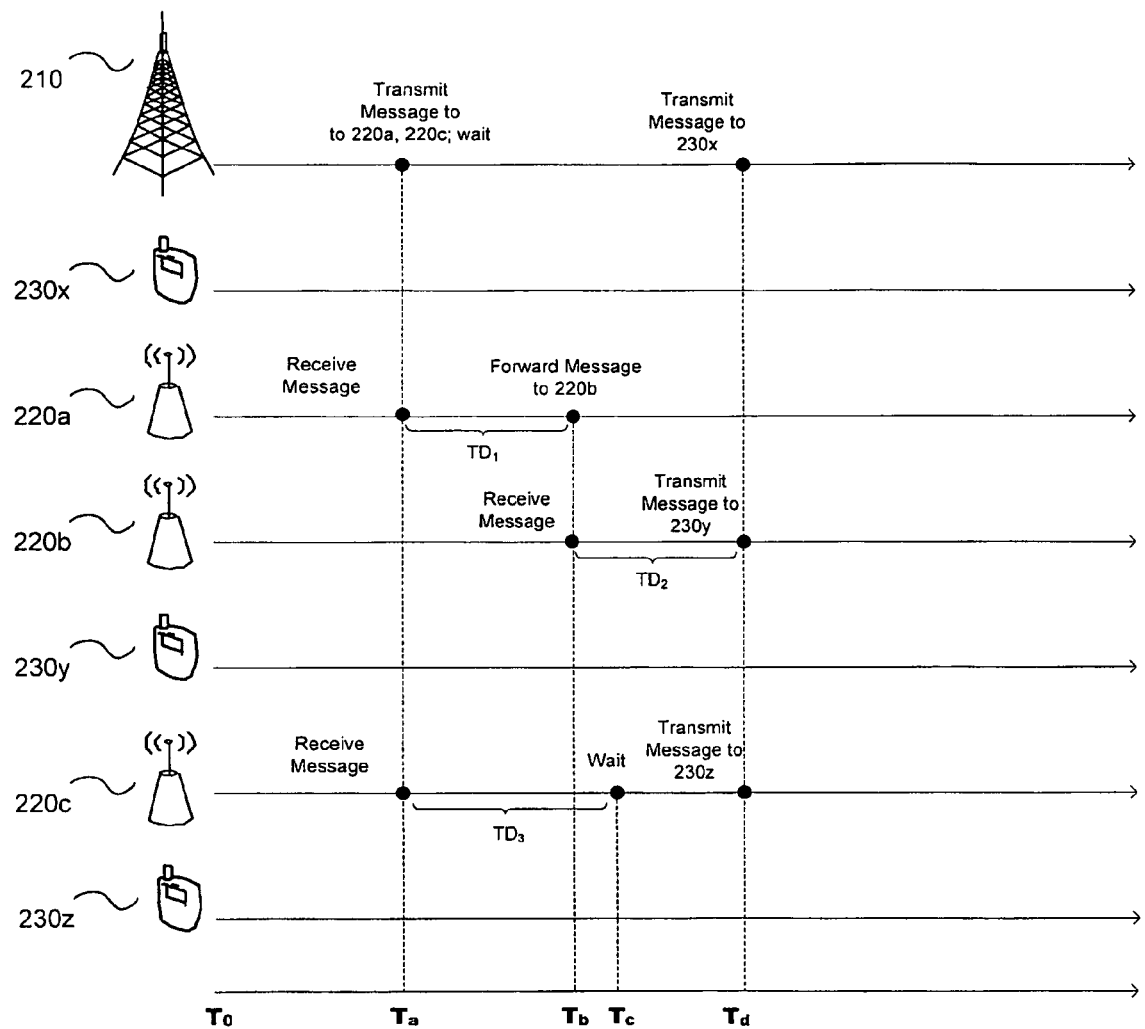
FIG. 13 is a signaling diagram of an exemplary synchronous transmission of a message in a TP, consistent with certain disclosed embodiments.

FIG. 13 is a signaling diagram of an exemplary synchronous transmission of a message in MR network 200, consistent with certain disclosed embodiments. As shown in FIG. 13, BS 210 may transmit a message to RSs 220*a* and 220*c* at time $T_a$.

RS 220*a* may receive the message and forward the message to access node RS 220*b* at time $T_b$. The time $(T_b-T_a)$ may represent the transmission delay $TD_1$ associated with RS 220*a*. Access node RS 220*b* may receive the forwarded message from RS 220*a*. Access node RS 220*b* may, in turn, prepare to transmit the message to SS 230*y* at time $T_d$. Thus, the time $(T_d-T_b)$ may represent the transmission delay $TD_2$ associated with RS 220*b*. Access node RS 220*c* may receive the message and prepare to transmit the message to SS 230*z* at time $T_c$. Thus, the time $(T_c-T_a)$ may represent the transmission delay $TD_3$ associated with RS 220*c*.

The total transmission path delay for transmission path TP 240*a* (including RSs 220*a* and 220*b*) may be $TD_1+TD_2$. The total transmission path delay for TP 240*b* (including RS 220*c*) may be $TD_3$. In this exemplary embodiment the total transmission path delay for TP 240*a* may be greater than the total transmission path delay for TP 240*b*. Therefore, RS 220*c* may wait until time $T_d$ to transmit the message to SS 230*z*. Alternatively and/or additionally, RS 220*c* may wait until $T_d$ plus a buffer amount of time to transmit the message to SS 230*z*.

For example, in an embodiment employing timestamping, BS 210 may send a message and a timestamp corresponding to $T_a$ to each access node RS 220 via its respective TP 240. Each access node RS 220 may already have a total target delay time stored before BS 210 transmits the message. The total target delay time may be equal to max{DL_TP for TP 240*a*, DL_TP for TP 240*b*}.

Access nodes RS 220*b* and 220*c*, and BS 210, once ready to transmit the message to SSs 230, may wait until a time equal to $T_a$ plus the total target delay time. Access nodes RS 220*b* and 220*c*, and BS 210, may transmit the message to SSs 230*x*, 230*y*, and 230*z* at time $T_d$. In one exemplary embodiment, transmission of the message to SSs 230*x*, 230*y*, and 230*z* may be simultaneous. In another exemplary embodiment, transmission of the message to SSs 230*x*, 230*y*, and 230*z* may be substantially simultaneous.

In an exemplary embodiment without timestamping, BS 210 may send a message to each access node RS 220 via its respective TP 240. Each access node RS 220 may already have an individual target delay time stored prior to transmission of the message by BS 210. For example, the individual target delay time for RS 220*b* may be zero. For RS 220*c*, the individual target delay time may be equal to $(T_d-T_c)$. For BS 210, the individual target delay time may be equal to $(T_d-T_a)$.

Access nodes RS 220*b* and 220*c*, and BS 210, once ready to transmit the message to SSs 230, may wait for their individual delay times, and may transmit the message to SSs 230*x*, 230*y*, and 230*z* at time $T_d$. In one exemplary embodiment, transmission of the message to SSs 230*x*, 230*y*, and 230*z* may be simultaneous. In another exemplary embodiment, transmission of the message to SSs 230*x*, 230*y*, and 230*z* may be substantially simultaneous.

Figure 14:
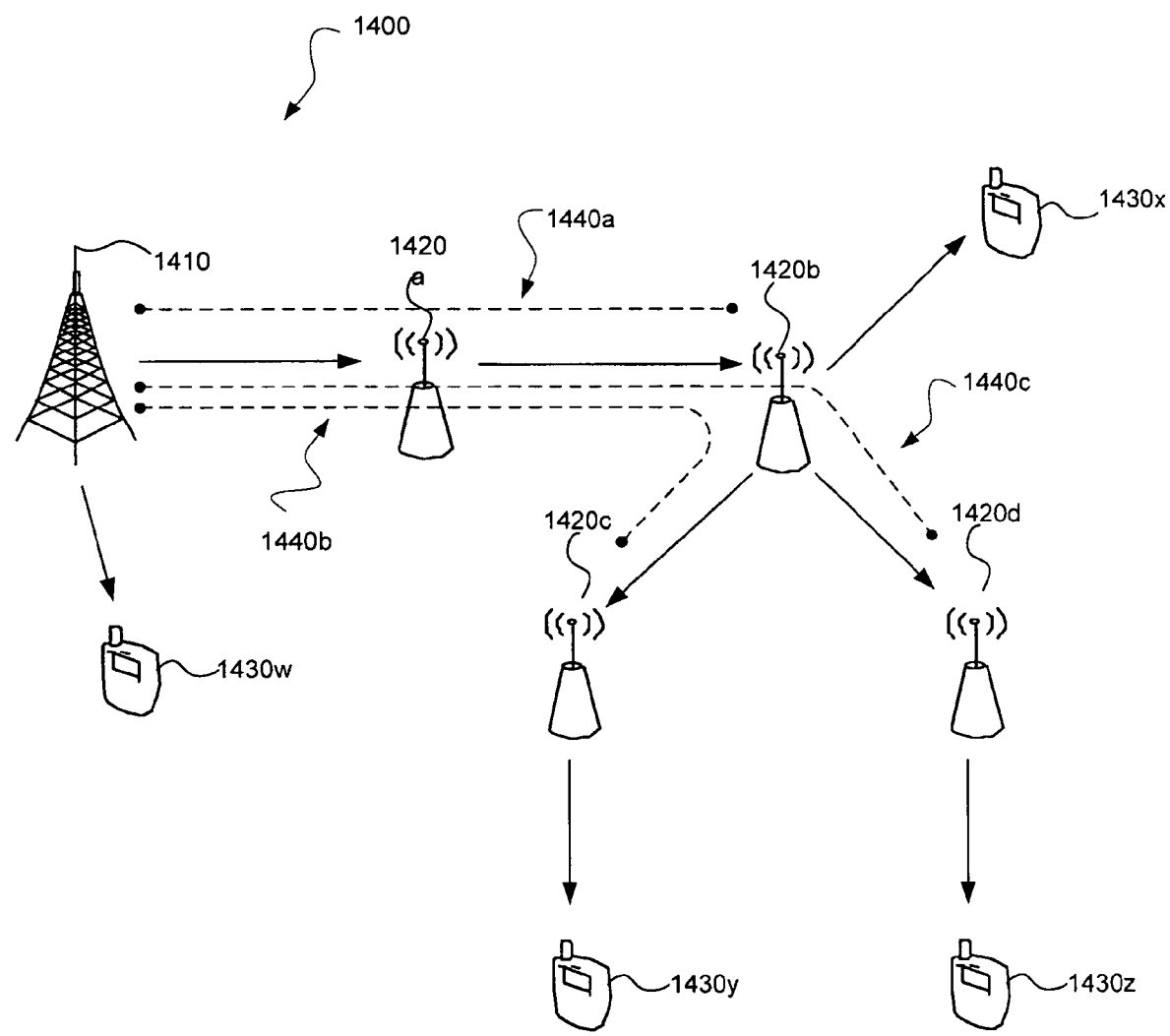
FIG. 14 is a block diagram of an exemplary Multi-Hop Relay (MR) network, consistent with certain disclosed embodiments.

FIG. 14 is a block diagram of an exemplary multi-hop relay (MR) network 1400. As shown in FIG. 14, communication between BS 1410 and SS 1430x may occur via TP 1440a. TP 1440a may include RSs 1420a and 1420b. Data may be transmitted from BS 1410 to RS 1420a, relayed from RS 1420a to RS 1420b, and transmitted from RS 1420b to SS 1430x. Data may also be transmitted from SS 1430x to RS 1420b, relayed from RS 1420b to RS 1420a, and transmitted by RS 1420a to BS 1410. RS 1420a may function as an intermediate node in TP 1440a, and RS 1420b may function as the access node in TP 1440a.

Similarly, communication between BS 1410 and an SS 1430y may occur via TP 1440b in like manner. In TP 1440b, RS 1420c may function as the access node, transmitting to and receiving transmissions from SS 1430y, and RSs 1420a and 1420b may function as intermediate nodes in TP 1440b. Communication between a BS 1410 and an SS 1430z may occur via a TP 1440c in like manner. In TP 1440c, RS 1420d may function as the access node, and RSs 1420b and 1420a may function as intermediate nodes.

Communication between BS 1410 and an SS 1430w may not utilize any RSs 1420. Thus, data may be transmitted directly from BS 1410 to SS 1430w, and from SS 1430w directly to BS 1410.

Figure 15:
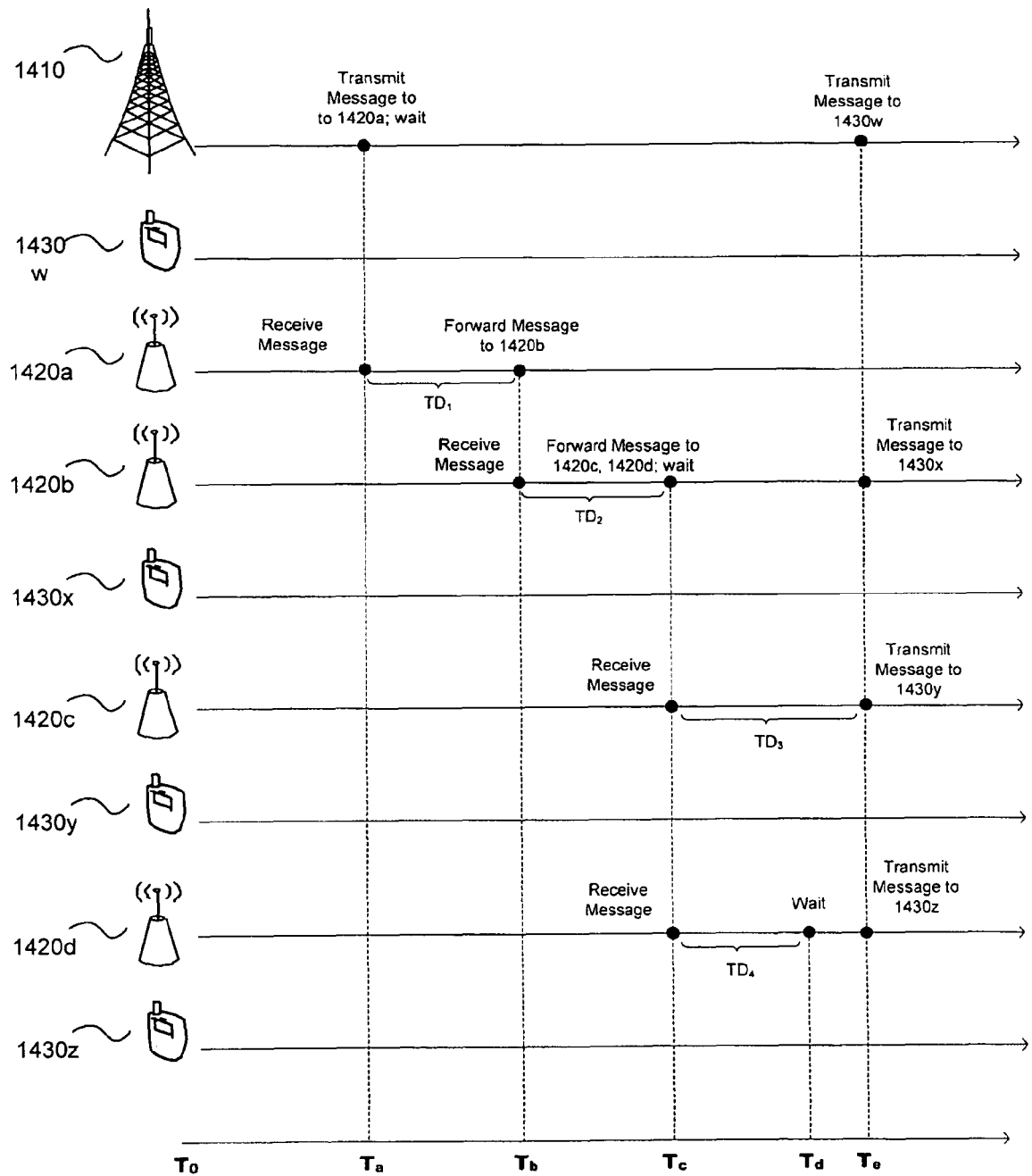
FIG. 15 is a signaling diagram of an exemplary synchronous transmission of a message, consistent with certain disclosed embodiments.

FIG. 15 is a signaling diagram of an exemplary synchronous transmission of a message in MR network 1400, consistent with certain disclosed embodiments. BS 1410 may transmit a message to RS 1420a at time $T_a$. RS 1420a may receive the message and forward the message to RS 1420b at time $T_b$. The time $(T_b-T_a)$ may represent the transmission delay $TD_1$ associated with RS 1420a. Similarly, RS 1420b may receive the message from RS 1420a, and may forward the message to RSs 1420c and 1420d at time $T_c$. The time $(T_c-T_b)$ may represent the transmission delay $TD_2$ associated with RS 1420b.

RS 1420c may receive the message and be ready to transmit the message to subscriber station SS 1430y at time $T_e$. Thus, time $(T_e-T_c)$ may represent the transmission delay $TD_3$ associated with RS 1420c. In addition, RS 1420d may receive the message and be prepared to transmit the message to subscriber station SS 1430z at time $T_d$. The time $(T_d-T_c)$ may represent the transmission delay $TD_4$ associated with RS 1420d.

As shown herein, the total transmission path delay for TP 1440a may be $TD_1+TD_2$. The total transmission path delay for TP 1440b may be $TD_1+TD_2+TD_3$. The total transmission path for TP 1440c may be $TD_1+TD_2+TD_4$.

For example, in an embodiment employing timestamping, BS 1410 may send a message and a timestamp corresponding to $T_a$ to each access node RS 1420 via its respective TP 1440. Each access node RS 1420 may already have a total target delay time stored before BS 1410 transmits the message. The total target delay time may be equal to max{DL_TP 1440a, DL_TP 1440b, DL_TP 1440c}, thus DL_RS 1440b may be $(T_e-T_a)$.

Access nodes RS 1420b, 1420c, and 1420d, and BS 1410, once ready to transmit the message to SSs 1430, may wait until a time equal to $T_a$ plus the total target delay time. Access nodes RS 1420b, 1420c, and 1420d, and BS 1410, may transmit the message to SSs 1430w, 1430x, 1430y, and 1430z at time $T_e$. In one exemplary embodiment, transmission of the message to SSs 1430w, 1430x, 1430y, and 1430z may be simultaneous. In another exemplary embodiment, transmission of the message to SSs 1430w, 1430x, 1430y, and 1430z may be substantially simultaneous.

For example, in an embodiment without timestamping, BS 1410 may send a message to each access node RS 1420 via its respective TP 1440. Each access node RS 1420, may already have an individual target delay time stored before BS 1410 transmits the message. For RS 1420c, the individual target delay time may be zero. For RS 1420d, the individual target delay time may be equal to $(T_e-T_d)$. For RS 1420b, the individual target delay time may be equal to $(T_e-T_c)$. For BS 1410, the individual target delay time may be equal to $(T_e-T_a)$.

Access nodes RS 1420b, 1420c, and 1420d, and BS 1410, once ready to transmit the message to subscriber stations SS 1430, may wait for their individual delay times, and may transmit the message to SSs 1430w, 1430x, 1430y, and 1430z at time $T_e$. In one exemplary embodiment, transmission of the message to SSs 1430w, 1430x, 1430y, and 1430z may be simultaneous. In another exemplary embodiment, transmission of the message to SSs 1430w, 1430x, 1430y, and 1430z may be substantially simultaneous.

It will be apparent to those skilled in the art that various modifications and variations can be made in the system and method for synchronous wireless transmission. It is intended that the standard and examples be considered as exemplary only, with a true scope of the disclosed embodiments being indicated by the following claims and their equivalents.

What is claimed is:

1. A method for managing wireless communication in a network by a network coordinator, the network including the network coordinator, a plurality of network nodes, and a plurality of subscriber stations, comprising:
   receiving, by the network coordinator, delay data associated with one or more transmission paths, wherein each of the one or more transmission paths includes at least one of the plurality of network nodes;
   calculating, for each of the one or more transmission paths, a total transmission path delay;
   calculating, for each of the one or more transmission paths, target delay data based on the total transmission path delay;
   sending, by the network coordinator, the target delay data along each of the one or more transmission paths;
   receiving, by the at least one of the plurality of network nodes, from at least one of the network coordinator or one or more upstream network nodes, target delay data;
   forwarding, by the at least one of the plurality of network nodes, to one or more downstream network nodes, the target delay data; and
   transmitting, by the network coordinator, a message along each of the one or more transmission paths, wherein the message is transmitted over an access link.

2. The method as in claim 1, wherein the receiving the delay data includes:
   receiving, for each of the one or more transmission paths, downstream delay data, wherein the downstream delay data includes network node delay data associated with one or more downstream network nodes located in a respective each of the one or more transmission paths;
   determining a scheduling delay for each of the one or more transmission paths; and
   calculating the transmission path delay for each of the one or more transmission paths, and wherein the transmission path delay is a sum of the network node delay data associated with the one or more downstream network nodes located in the respective each of the one or more transmission paths and the scheduling delay.

3. The method as in claim 1, wherein the receiving the delay data includes:
   receiving, for each of the one or more transmission paths, transmission path delay data, wherein the transmission path delay data is a sum of the network node delay data associated with one or more downstream network nodes located in a respective each of the one or more transmission paths.

4. The method as in claim 1, wherein the calculating the target delay data includes:
determining, for the one or more transmission paths, a total target delay time, wherein the total target delay time is greater than or equal to a largest single total transmission path delay of the total transmission delay times.

5. The method as in claim 4, wherein the sending the target delay data includes:
sending, to an access network node in each of the one or more transmission paths, the total target delay time, wherein the access network node is one of the plurality of network nodes, and communicates with one or more of the plurality of subscriber stations.

6. The method as in claim 4, wherein the calculating the target delay data includes:
determining, for an access network node in each of the one or more transmission paths, an access node target delay time, wherein the access network node is one of the plurality of network nodes, and the access network node communicates with one or more of the plurality of subscriber stations; and
sending, to the access network node, the access node target delay time.

7. The method as in claim 1, wherein the transmitting the message further includes:
creating a timestamp associated with a message transmission time; and
sending the timestamp along with the message.

8. The method as in claim 1, wherein the transmitting the message further includes:
creating a timestamp associated with a message transmission time; and
sending the timestamp separately from the message.

9. The method as in claim 1, wherein the transmitting the message further includes:
pre-transmitting, by the network coordinator, the message over a relay downlink prior to transmitting the message over the access link.

10. The method as in claim 1, wherein the sending the target delay data further includes:
sending, by the network coordinator, the target delay data along each of the one or more transmission paths in a downstream signaling message.

11. The method as in claim 1, wherein the receiving delay data further includes:
receiving, by the network coordinator, the delay data associated with one or more transmission paths in an upstream signaling message.

12. The method as in claim 1, wherein each transmission path includes one or more access network nodes, the one or more access network nodes relaying transmissions from at least one of the network coordinator or one or more of the plurality of network nodes to one or more of the plurality of subscriber stations, and relaying transmissions from the one or more of the plurality of subscriber stations to at least one of the network coordinator or one or more of the plurality of network nodes, the method further including:
transmitting, by the network coordinator, the message to one or more of the plurality of subscriber stations synchronously with a transmission from the one or more access network nodes.

13. A network coordinator for managing wireless communication in a network, the network including the network coordinator, a plurality of network nodes, and a plurality of subscriber stations, the network coordinator comprising:
at least one memory to store data and instructions; and
at least one processor configured to access the memory and, when executing the instructions, to:
receive, by the network coordinator, delay data associated with one or more transmission paths, wherein each of the one or more transmission paths includes at least one of the plurality of network nodes;
calculate, for each of the one or more transmission paths, a total transmission path delay;
calculate, for each of the one or more transmission paths, target delay data based on the total transmission path delay;
send, by the network coordinator, the target delay data along each of the one or more transmission paths, wherein the target delay data is received by the at least one of the plurality of network nodes, from at least one of the network coordinator or one or more upstream network nodes, and forwarded, by the at least one of the plurality of network nodes, to one or more downstream network nodes; and
transmit, by the network coordinator, a message along each of the one or more transmission paths, wherein the message is transmitted over an access link.

14. The network coordinator of claim 13, wherein when the at least one processor is configured to receive the delay data, the at least one processor is further configured to:
receive, for each of the one or more transmission paths, downstream delay data, wherein the downstream delay data includes network node delay data associated with one or more downstream network nodes located in a respective each of the one or more transmission paths;
determine a scheduling delay for each of the one or more transmission paths; and
calculate a transmission path delay for each of the one or more transmission paths, and wherein the transmission path delay is a sum of the network node delay data associated with the one or more downstream network nodes located in the respective each of the one or more transmission paths and the schedule delay.

15. The network coordinator of claim 13, wherein when the at least one processor is configured to receive the delay data, the at least one processor is further configured to:
receive, for each of the one or more transmission paths, transmission path delay data, wherein the transmission path delay data is a sum of the network node delay data associated with one or more downstream network nodes located in a respective each of the one or more transmission paths.

16. The network coordinator of claim 13, wherein when the at least one processor is configured to calculate the target delay data, the at least one processor is further configured to:
determine, for the one or more transmission paths, a total target delay time, wherein the total target delay time is greater than or equal to a largest single total transmission path delay of the total transmission delay times.

17. The network coordinator of claim 16, wherein when the at least one processor is configured to send the target delay data, the at least one processor is further configured to:
send, to an access network node in each of the one or more transmission paths, the total target delay time, wherein the access network node is one of the plurality of network nodes, and communicates with one or more of the plurality of subscriber stations.

18. The network coordinator of claim 16, wherein when the at least one processor is configured to calculate the target delay data, the at least one processor is further configured to:
- determine, for an access network node in each of the one or more transmission paths, an access node target delay time, wherein the access network node is one of the plurality of network nodes, and the access network node communicates with one or more of the plurality of subscriber stations; and
- send, to the access network node, the access node target delay time.

19. The network coordinator of claim 13, wherein when the at least one processor is configured to transmit the message, the at least one processor is further configured to:
- create a timestamp associated with a message transmission time; and
- send the timestamp along with the message.

20. The network coordinator of claim 13, wherein when the at least one processor is configured to transmit the message, the at least one processor is further configured to:
- create a timestamp associated with a message transmission time; and
- send the timestamp separately from the message.

21. The network coordinator of claim 13, wherein when the at least one processor is configured to transmit the message, the at least one processor is further configured to:
- pre-transmit, by the network coordinator, the message over a relay downlink prior to transmitting the message over the access link.

22. The network coordinator of claim 13, wherein when the at least one processor is configured to send the target delay data, the at least one processor is further configured to:
- send, by the network coordinator, the target delay data along each of the one or more transmission paths in a downstream signaling message.

23. The network coordinator of claim 13, wherein when the at least one processor is configured to receive the delay data, the at least one processor is further configured to:
- receive, by the network coordinator, the delay data in an upstream signaling message.

24. The network coordinator of claim 13, wherein each transmission path includes one or more access network nodes, the one or more access network nodes relaying transmissions from at least one of the network coordinator or one or more of the plurality of network nodes to one or more of the plurality of subscriber stations, and relaying transmissions from the one or more of the plurality of subscriber stations to at least one of the network coordinator or one or more of the plurality of network nodes, wherein the at least one processor is further configured to:
- transmit, by the network coordinator, the message to one or more of the plurality of subscriber stations synchronously with a transmission from the one or more access network nodes.

25. A method for performing wireless communication in a multi-hop relay network by an access network node, the multi-hop relay network including a network coordinator, a plurality of network nodes, and a plurality of subscriber stations, wherein the access network node is included in the plurality of network nodes, comprising:
- sending, by the access network node, delay data to at least one of the network coordinator or one or more upstream network nodes included in the multi-hop relay network, wherein the delay data includes a network node delay data associated with the access network node, and wherein the one or more upstream network nodes include any of the plurality of network nodes located along an upstream transmission path between the access network node and the network coordinator;
- receiving, from at least one of the network coordinator or the one or more upstream network nodes, target delay data, wherein the target delay data is based on the delay data;
- forwarding, to one or more downstream network nodes, the target delay data;
- receiving, from at least one of the network coordinator or the one or more upstream network nodes, a message; and
- transmitting, at a target transmission time, the message to one or more of the plurality of subscriber stations, wherein the target transmission time is based on the target delay data.

26. The method as in claim 25, wherein the access network node forwards transmissions from at least one of the network coordinator or the one or more upstream network nodes to one or more downstream network nodes, and forwards transmissions from the one or more downstream network nodes to at least one of the network coordinator or the one or more upstream network nodes, wherein the one or more downstream network nodes are located along one or more downstream transmission paths between the access network node and at least one of the plurality of subscriber stations, and wherein the sending the delay data includes:
- determining network node delay data associated with the access network node; and
- sending the network node delay data to at least one of the network coordinator or the one or more upstream network nodes.

27. The method as in claim 25, wherein the target delay data further includes a delay time value, and the target transmission time is the message transmission time plus the delay time value, and wherein the receiving the message further includes:
- receiving a timestamp value, wherein the target transmission time is the timestamp value plus the delay time value; and
- transmitting, at a time associated with the timestamp value, the message to one or more of the plurality of subscriber stations.

28. The method as in claim 27, wherein the timestamp value is received with the message.

29. The method as in claim 27, wherein the timestamp value is received separately from the message.

30. A wireless communication station for performing wireless communication in a multi-hop relay network, the multi-hop relay network including a network coordinator, a plurality of network nodes including the wireless communication station, and a plurality of subscriber stations, the wireless communication station comprising:
- at least one memory to store data and instructions; and
- at least one processor configured to access the memory and, when executing the instructions, to:
  - send, by the wireless communication station, delay data to at least one of the network coordinator or one or more upstream network nodes included in the multi-hop relay network, wherein the delay data includes a network node delay data associated with the wireless communication station, and wherein the one or more upstream network nodes include any of the plurality of network nodes located along an upstream transmission path between the wireless communication station and the network coordinator;

receive, from at least one of the network coordinator or the one or more upstream network nodes, target delay data, wherein the target delay data is based on the delay data;

forward, to one or more downstream network nodes, the target delay data;

receive, from at least one of the network coordinator or the one or more upstream network nodes, a message; and transmit, at a target transmission time, the message to one or more of the plurality of subscriber stations, wherein the target transmission time is based on the target delay data.

31. The wireless communication station of claim 30, wherein the wireless communication station forwards transmissions from at least one of the network coordinator or the one or more upstream network nodes to one or more downstream network nodes, and forwards transmissions from the one or more downstream network nodes to at least one of the network coordinator or the one or more upstream network nodes, wherein the one or more downstream network nodes are located along one or more downstream transmission paths between the wireless communication station and at least one of the plurality of subscriber stations, and the at least one processor is further configured to:

determine network node delay data associated with the wireless communication station; and send the network node delay data to at least one of the network coordinator or the one or more upstream network nodes.

32. The wireless communication station of claim 30, wherein the target delay data further includes a delay time value, and the target transmission time is the message transmission time plus the delay time value, and wherein when the at least one processor is configured to receive the message, the at least one processor is further configured to:

receive a timestamp value, wherein the target transmission time is the timestamp value plus the delay time value; and transmit, at a time associated with the timestamp value, the message to one or more of the plurality of subscriber stations.

33. The wireless communication station of claim 32, wherein the timestamp value is received with the message.

34. The wireless communication station of claim 32, wherein the timestamp value is received separately from the message.

35. A method for performing wireless communication in a multi-hop relay network by an intermediary network node, the multi-hop relay network including a network coordinator, the plurality of network nodes, and a plurality of subscriber stations, wherein the intermediary network node is included in the plurality of network nodes, comprising:

sending, by the intermediary network node, network node delay data to at least one of the network coordinator or one or more upstream network nodes included in the multi-hop relay network, wherein the network node delay data is associated with the intermediary network node, and wherein the one or more upstream network nodes include any of the plurality of network nodes located along an upstream transmission path between the intermediary network node and the network coordinator;

forwarding, to at least one of the network coordinator or the one or more upstream network nodes, downstream delay data, wherein the downstream delay data is associated with one or more downstream network nodes located along a downstream transmission path between the intermediary network node and one or more of the plurality of subscriber stations;

receiving, from at least one of the network coordinator or the one or more upstream network nodes, target delay data;

forwarding, to the one or more downstream network nodes, the target delay data;

receiving, from at least one of the network coordinator or the one or more upstream network nodes, a message; and forwarding the message to the one or more downstream network nodes.

36. The method as in claim 35, wherein the sending the network node delay data further includes:

determining the network node delay data associated with the intermediary network node; and sending the network node delay data to at least one of the network coordinator or the one or more upstream network nodes.

37. The method as in claim 36, wherein the delay data includes transmission path delay data and forwarding the downstream delay data includes:

receiving the transmission path delay data from one of the one or more downstream network nodes associated with each the one or more downstream transmission paths;

adding the network node delay data to the transmission path delay data to generate an updated transmission path delay data; and sending the updated transmission path delay data to at least one of the one or more upstream network nodes, wherein the transmission path delay data associated with each of the one or more downstream transmission paths is a sum of the node delay data associated with each node in a corresponding each of the one or more downstream transmission paths.

38. The method as in claim 35, wherein the delay data includes downstream network node delay data and forwarding the downstream delay data includes:

receiving the downstream network node delay data from each of the one or more downstream network nodes; and forwarding the downstream network node delay data to one or more upstream network nodes.

39. The method as in claim 35, further including:

receiving a total target delay time, wherein the total target delay time is a time value; and sending, to the one or more downstream network nodes located along each of the one or more downstream transmission paths, the total target delay time.

40. The method as in claim 35, wherein the receiving the target delay data further includes:

receiving, for each of the one or more downstream network nodes transmitting to one or more of the plurality of subscriber stations, respective individual target delay time values.

41. The method as in claim 40, wherein the forwarding the target delay data further includes:

sending, to each of the one or more downstream network nodes transmitting directly to one or more of the plurality of subscriber stations, the respective individual target delay time values.

42. The method as in claim 41, wherein the receiving the message further includes:
  receiving a timestamp value associated with the message transmission time, wherein the target transmission time is the timestamp value plus the delay time value.

43. The method as in claim 42, wherein the timestamp value is received with the message.

44. The method as in claim 42, wherein the timestamp value is received separately from the message.

45. The method as in claim 35, wherein the forwarding the message further includes:
  forwarding, to at least one of the one or more downstream network nodes, the message;
  receiving a timestamp value associated with the transmission time of the message; and
  forwarding, to at least one of the one or more downstream network nodes, the timestamp, wherein the target delay data further includes a delay time value, and the target transmission time is a message transmission time plus the delay time value; and
  transmitting, at the target transmission time, the message to one or more of the plurality of subscriber stations.

46. A wireless communication station for performing wireless communication in a multi-hop relay network, the multi-hop relay network including a network coordinator, a plurality of network nodes including the wireless communication station, and a plurality of subscriber stations, the wireless communication station comprising:
  at least one memory to store data and instructions; and
  at least one processor configured to access the memory and, when executing the instructions, to:
    send, by the wireless communication station, network node delay data to at least one of the network coordinator or one or more upstream network nodes included in the multi-hop relay network, wherein the network node delay data is associated with the wireless communication station, and wherein the one or more upstream network nodes include any of the plurality of network nodes located along an upstream transmission path between the wireless communication station and the network coordinator;
    forward, to at least one of the network coordinator or the one or more upstream network nodes, downstream delay data, wherein the downstream delay data is associated with one or more downstream network nodes located along a downstream transmission path between the wireless communication station and one or more of the plurality of subscriber stations;
    receive, from at least one of the network coordinator or the one or more upstream network nodes, target delay data;
    forward, to the one or more downstream network nodes, the target delay data;
    receive, from at least one of the network coordinator or the one or more upstream network nodes, a message; and
    forward the message to the one or more downstream network nodes.

47. The wireless communication station of claim 46, wherein when the at least one processor is configured to send the network node delay data, the at least one processor is further configured to:
  determine the network node delay data associated with the wireless communication station; and
  send the network node delay data to at least one of the network coordinator or the one or more upstream network nodes.

48. The wireless communication station of claim 47, wherein the delay data includes transmission path delay data and when the at least one processor is configured to forward the downstream delay data, the processor is further configured to:
  receive the transmission path delay data from one of the one or more downstream network nodes associated with each the one or more downstream transmission paths;
  add the network node delay data to the transmission path delay data to generate an updated transmission path delay data; and
  send the updated transmission path delay data to at least one of the one or more upstream network nodes, wherein the transmission path delay data associated with each of the one or more downstream transmission paths is a sum of the node delay data associated with each node in a corresponding each of the one or more downstream transmission paths.

49. The wireless communication station of claim 46, wherein the delay data includes downstream network node delay data and when the at least one processor is configured to forward the downstream delay data, the at least one processor is further configured to:
  receive the downstream network node delay data from each of the one or more downstream network nodes; and
  forward the downstream network node delay data to one or more upstream network nodes.

50. The wireless communication station of claim 46, wherein the at least one processor is further configured to:
  receive a total target delay time, wherein the total target delay time is a time value; and
  send, to the one or more downstream network nodes located along each of the one or more downstream transmission paths, the total target delay time.

51. The wireless communication station of claim 46, wherein when the at least one processor is configured to receive the target delay data, the at least one processor is further configured to:
  receive, for each of the one or more downstream network nodes transmitting to one or more of the plurality of subscriber stations, respective individual target delay time values.

52. The wireless communication station of claim 46, wherein when the at least one processor is configured to forward the target delay data, the at least one processor is further configured to:
  send, to each of the one or more downstream network nodes transmitting directly to one or more of the plurality of subscriber stations, the respective individual target delay time values.

53. The wireless communication station of claim 52, wherein when the at least one processor is configured to receive the message, the at least one processor is further configured to:
  receive a timestamp value associated with the message transmission time, wherein the target transmission time is the timestamp value plus the delay time value.

54. The wireless communication station of claim 53, wherein the timestamp value is received with the message.

55. The wireless communication station of claim 53, wherein the timestamp value is received separately from the message.

56. The wireless communication station of claim 52, wherein when the at least one processor is configured to forward the message, the at least one processor is further configured to:
- forward, to at least one of the one or more downstream network nodes, the message;
- receive a timestamp value associated with the transmission time of the message; and
- forward, to at least one of the one or more downstream network nodes, the timestamp, wherein the target delay data further includes a delay time value, and the target transmission time is a message transmission time plus the delay time value; and
- transmit, at the target transmission time, the message to one or more of the plurality of subscriber stations.

* * * * *